(12) United States Patent  
Noda

(10) Patent No.: US 9,360,929 B2
(45) Date of Patent: Jun. 7, 2016

(54) DISPLAY CONTROL APPARATUS, DISPLAY CONTROL METHOD, AND PROGRAM

(75) Inventor: Takuro Noda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 167 days.

(21) Appl. No.: 13/537,175

(22) Filed: Jun. 29, 2012

(65) Prior Publication Data

US 2013/0009863 A1 Jan. 10, 2013

(30) Foreign Application Priority Data

Jul. 6, 2011 (JP) ................................. 2011-150485

(51) Int. Cl.
| | |
|---|---|
| *G09G 5/00* | (2006.01) |
| *G09G 5/08* | (2006.01) |
| *G06F 3/033* | (2013.01) |
| *G06F 3/00* | (2006.01) |
| *G06F 3/01* | (2006.01) |
| *G02B 27/22* | (2006.01) |
| *G02B 27/26* | (2006.01) |
| *G09G 3/00* | (2006.01) |
| *G09G 3/36* | (2006.01) |

(52) U.S. Cl.
CPC ............... *G06F 3/005* (2013.01); *G06F 3/012* (2013.01); *G06F 3/013* (2013.01); *G02B 27/2214* (2013.01); *G02B 27/26* (2013.01); *G06F 2203/04803* (2013.01); *G06F 2203/04804* (2013.01); *G09G 3/003* (2013.01); *G09G 3/3611* (2013.01); *G09G 2340/0464* (2013.01); *G09G 2340/14* (2013.01); *G09G 2354/00* (2013.01)

(58) Field of Classification Search
CPC ............. G09G 5/00; G09G 5/32; G09G 5/42; G09G 5/02; G09G 5/377; G06T 15/40
USPC ...................................................... 345/87, 156
See application file for complete search history.

(56) References Cited

U.S. PATENT DOCUMENTS

| | | | |
|---|---|---|---|
| 2008/0049020 A1* | 2/2008 | Gusler et al. ................... | 345/427 |
| 2010/0053151 A1* | 3/2010 | Marti et al. .................... | 345/419 |
| 2010/0123544 A1* | 5/2010 | Wu ................................ | 340/3.1 |
| 2010/0194880 A1 | 8/2010 | Furutani et al. | |
| 2012/0102438 A1* | 4/2012 | Robinson et al. .............. | 715/863 |
| 2012/0300061 A1* | 11/2012 | Osman et al. .................. | 348/135 |
| 2013/0207896 A1* | 8/2013 | Robinson et al. .............. | 345/158 |

FOREIGN PATENT DOCUMENTS

JP 2010-183378 A 8/2010

* cited by examiner

*Primary Examiner* — Amit Chatly
(74) *Attorney, Agent, or Firm* — Chip Law Group

(57) ABSTRACT

A display control apparatus controls display of a transparent display which includes a screen configured to transmit light arriving from an object located on a side of a second surface so that the object is viewable from a viewpoint located on a side of a first surface which is an opposite surface to the second surface. The display control apparatus includes: an acquisition unit that acquires position information indicating relative positional relations between the transparent display and the viewpoint and between the transparent display and the object; and a display control unit that controls the display of the transparent display based on the position information.

15 Claims, 26 Drawing Sheets

FIG. 4
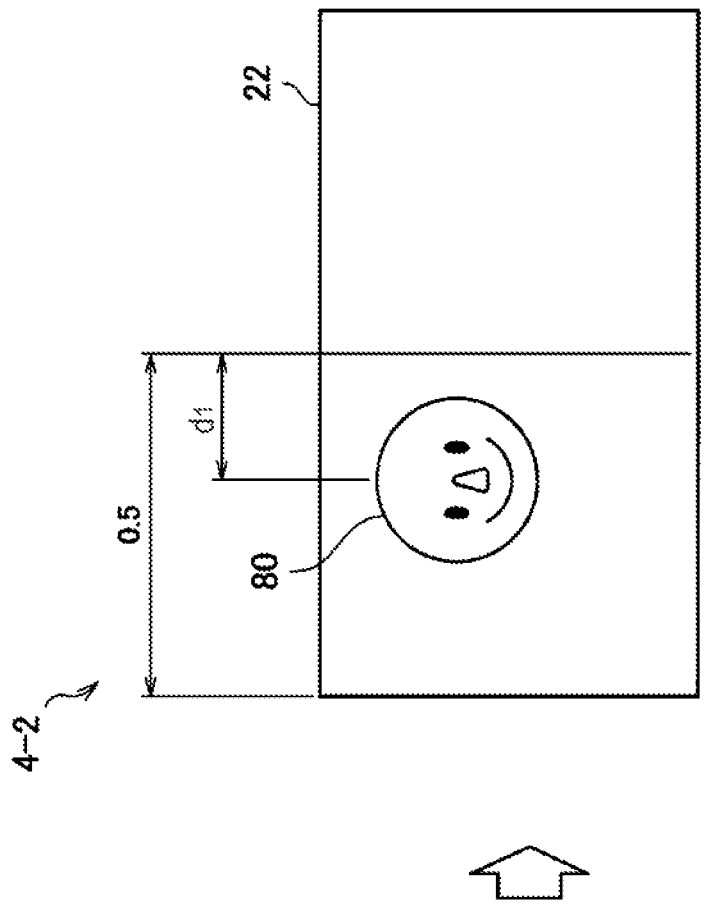
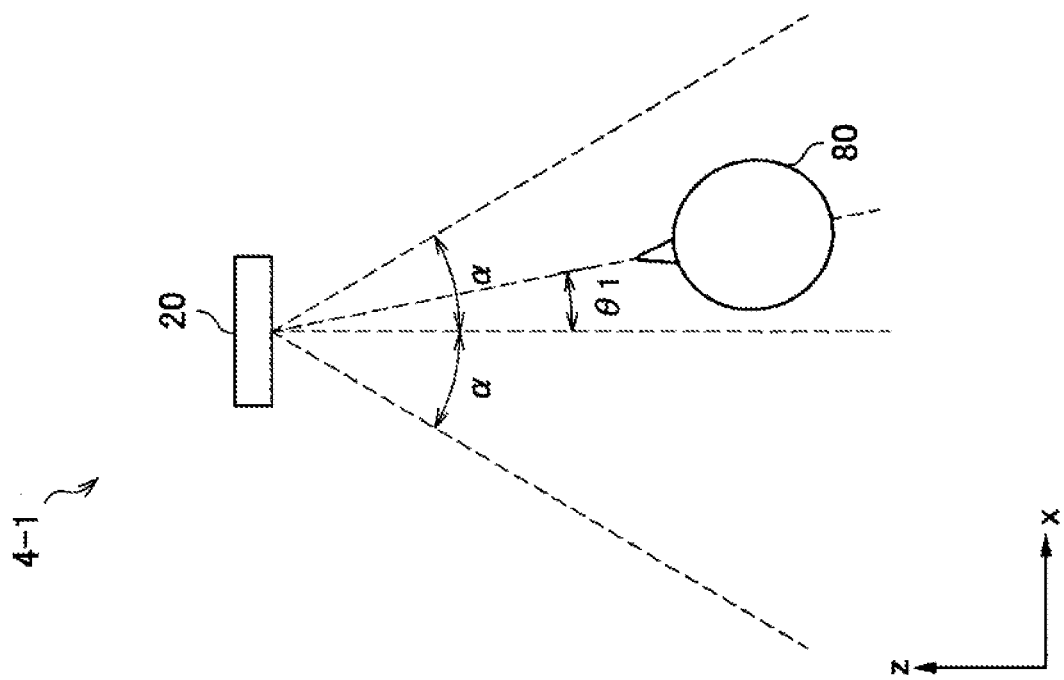

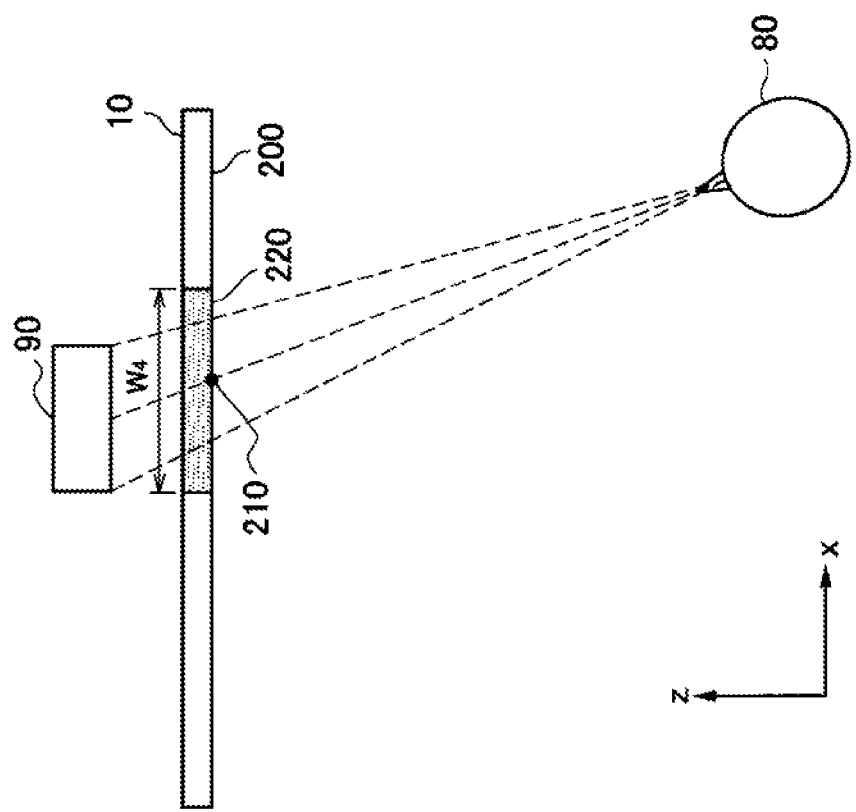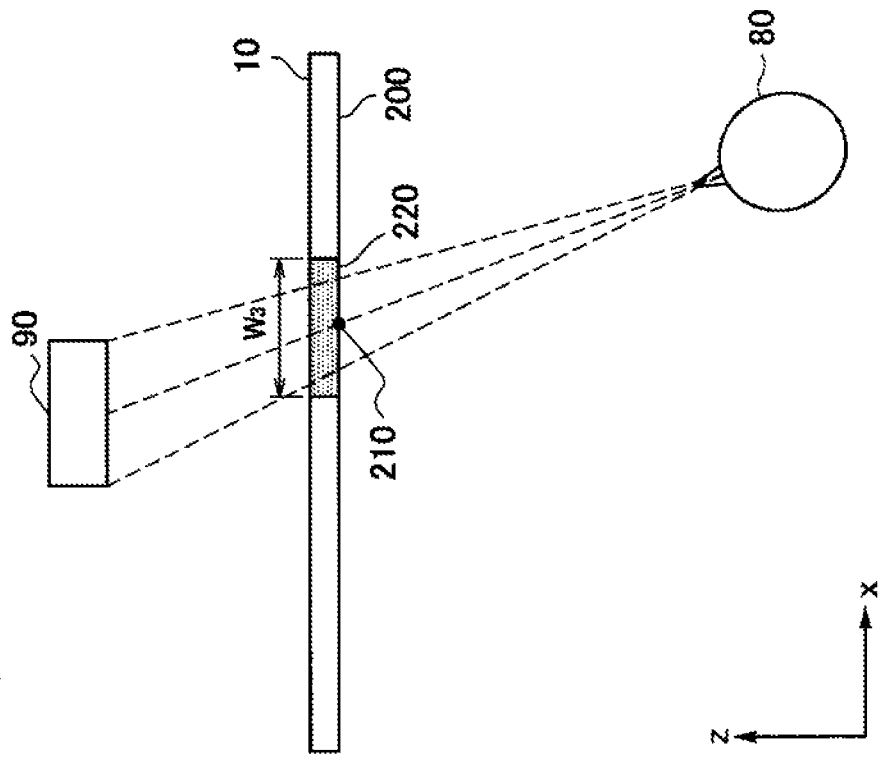
FIG. 9

FIG. 13
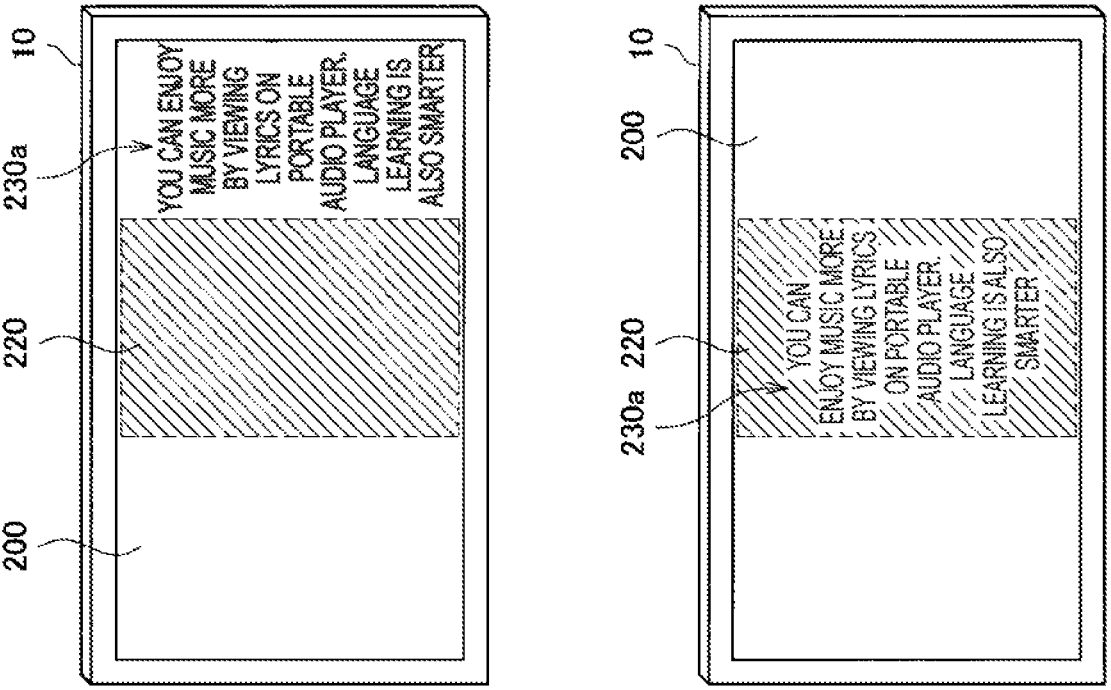
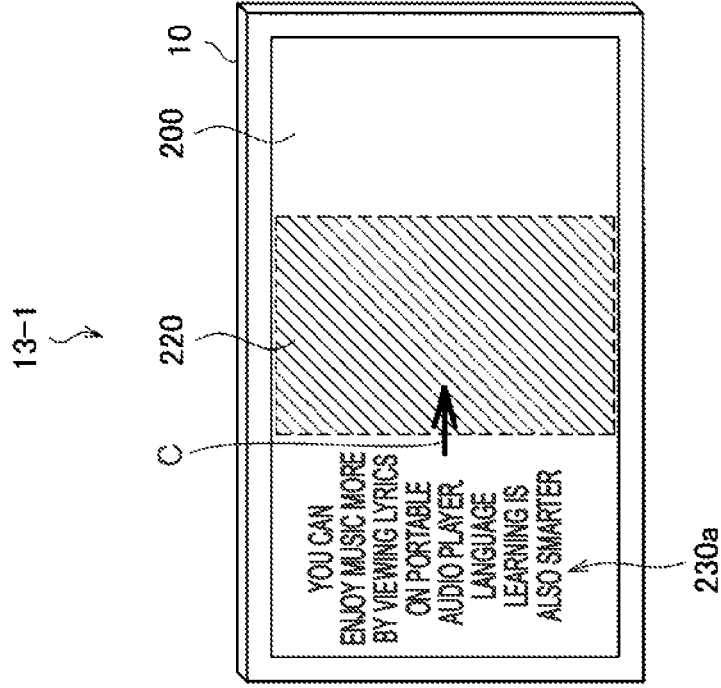

FIG. 14
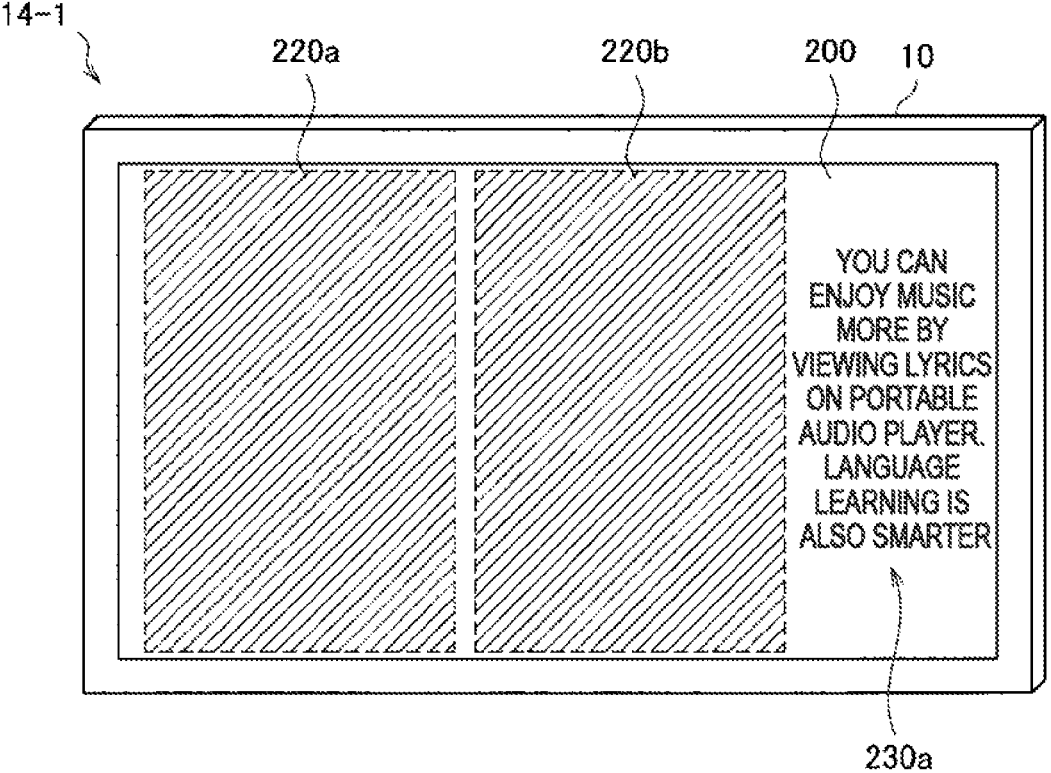
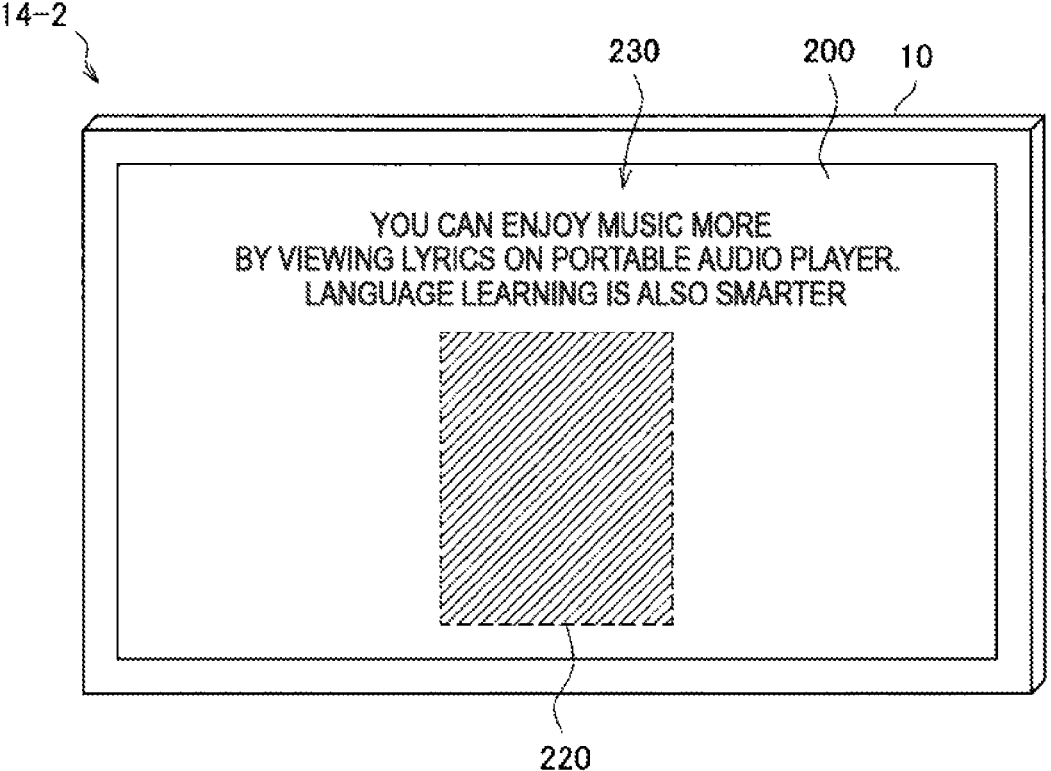

DISPLAY CONTROL APPARATUS, DISPLAY CONTROL METHOD, AND PROGRAM

CROSS-REFERENCE TO RELATED APPLICATION

The present application claims priority from Japanese Patent Application No. JP 2011-150485 filed in the Japanese Patent Office on Jul. 6, 2011, the entire content of which is incorporated herein by reference.

BACKGROUND

The present disclosure relates to a display control apparatus, a display control method, and a computer program.

In recent years, transparent displays that include a screen transmitting light from one surface side to the other surface side have been realized and developed. The transparent displays are realized by liquid crystal such as polymer-dispersed liquid crystal. The liquid crystal diffuses light when an application voltage is in an off-state, and transmits light when the application voltage is in an on-state.

Japanese Unexamined Patent Application Publication No. 2010-183378 discloses a technology of changing the direction of characters or signs displayed on the screen of a transparent display depending on a surface of a transparent display viewed by a user in a portable telephone including the transparent display.

SUMMARY

In the technology disclosed in Japanese Unexamined Patent Application Publication No. 2010-183378, when a user views an object through a transparent display from a given viewpoint, characters or signs on the screen of the transparent display may not be displayed in a suitable state for the user. For example, the characters or the signs displayed on the screen of the transparent display may hinder the user from viewing the object.

It is desirable to provide a novel and improved display control apparatus, a novel and improved display control method, and a novel and improved computer program suitable for viewing an object from a viewpoint through a transparent display.

According to an embodiment of the present disclosure, there is provided a display control apparatus controlling display of a transparent display which includes a screen configured to transmit light arriving from an object located on a side of a second surface so that the object is viewable from a viewpoint located on a side of a first surface which is an opposite surface to the second surface. The display control apparatus includes: an acquisition unit that acquires position information indicating relative positional relations between the transparent display and the viewpoint and between the transparent display and the object; and a display control unit that controls the display of the transparent display based on the position information.

According to another embodiment of the present disclosure, there is provided a display control method of controlling display of a transparent display which includes a screen configured to transmit light arriving from an object located on a side of a second surface so that the object is viewable from a viewpoint located on a side of a first surface which is an opposite surface to the second surface. The display control method includes: acquiring position information indicating relative positional relations between the transparent display and the viewpoint and between the transparent display and the object; and controlling the display of the transparent display based on the position information.

According to still another embodiment of the present disclosure, there is provided a computer program causing a computer, which is directly or indirectly connected to a transparent display which includes a screen configured to transmit light arriving from an object located on a side of a second surface so that the object is viewable from a viewpoint located on a side of a first surface which is an opposite surface to the second surface, to execute: acquiring position information indicating relative positional relations between the transparent display and the viewpoint and between the transparent display and the object; and controlling the display of the transparent display based on the position information. Here, the computer program may be supplied using a computer readable recording medium or may be supplied via a communication unit or the like.

According to the embodiments of the present disclosure described above, it is possible to realize the display of the transparent display suitable for viewing an object from a viewpoint through the transparent display.

BRIEF DESCRIPTION OF THE DRAWINGS

FIG. 4 is a diagram illustrating a method of specifying the direction of the viewpoint on an xz plane (horizontal plane);

FIG. 9 is a diagram illustrating a third example of the interference region;

FIG. 13 is a diagram illustrating an example of the display object moving in the screen including the interference region;

FIG. 14 is a diagram illustrating an interference region according to a modified example;

DETAILED DESCRIPTION OF THE EMBODIMENTS

Figure 1:
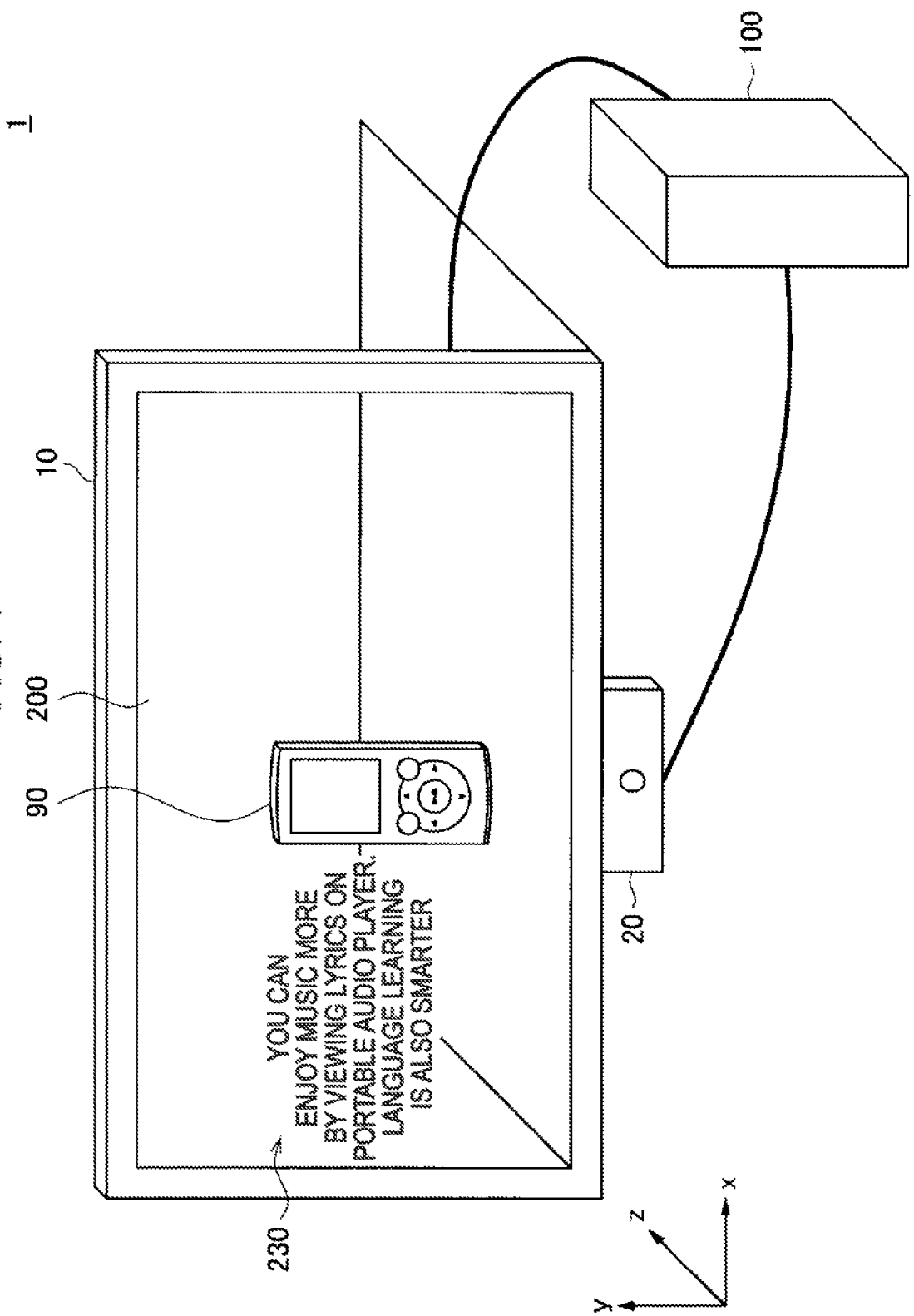
FIG. 1 is a schematic diagram illustrating an example of a display control system according to an embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Overview of Display Control System
2. Configuration of Display Control Apparatus
   2.1. Logical Configuration of Display Control Apparatus
   2.2. Display Control Unit
   2.3. Hardware Configuration of Display Control Apparatus
3. Processing Flow
4. Summarization 1. Overview of Display Control System First, the overall configuration of a display control system according to an embodiment of the present disclosure will be described with reference to FIG. 1. FIG. 1 is a schematic diagram illustrating an example of a display control system 1 according to this embodiment. The display control system 1 according to this embodiment includes a transparent display 10, a camera 20, and a display control apparatus 100. In FIG. 1 and other drawings, x, y, and z axes representing three perpendicular axes in a three-dimensional space are illustrated. More specifically, the x axis represents an axis parallel to a horizontal direction of a screen 200 of the transparent display 10. The y axis represents an axis parallel to the vertical direction of the screen 200 of the transparent display 10. The z axis represents an axis perpendicular to the screen 200 (xy plane) of the transparent display 10.

Transparent Display 10

The transparent display 10 is a display apparatus that includes the screen 200 configured to transmit light arriving from an object 90 located on the side of a second surface so that the object 90 can be viewed from a viewpoint position set on the side of a first surface which is the opposite surface to the second surface. The transparent display 10 can display a generated display image on the screen 200. The display image to be displayed includes a display object 230 such as a menu, a figure, text, an icon, or a window. The transparent display 10 can be realized using, for example, polymer-scattered liquid crystal (polymer-dispersed liquid crystal or polymer network liquid crystal). The transparent display 10 may be realized using other liquid crystal, an organic electro-luminescence display, or the like.

The transparent display 10 may be a touch panel apparatus that includes a touch detection surface. In this case, a display position of the display object 230 displayed on the screen 200 of the transparent display 10 may be changed in response to a touch on the screen 200. Further, a resistive film method, an electrostatic capacitance method, an optical method, an electromagnetic induction method, an ultrasonic wave method, or the like may be applied as the method of detecting a touch. However, the embodiment of the present disclosure is not limited thereto, but any method of detecting a touch can be used:

The transparent display 10 may be a display apparatus that displays the display object 230 on the screen 200 so as to be stereoscopically viewable. More specifically, the transparent display 10 displays right-eye and left-eye images on the screen 200. The right-eye image includes a right-eye object of the display object 230. The left-eye image includes a left-eye object of the display object 230. An offset in right and left directions (that is, the x-axis direction) is present between the display positions of the right-eye and left-eye objects within the screen 200. The offset causes a deviation (that is, a parallax between the eyes) in the relative position of the display object 230 to occur between the right and left retinas of a person who views the screen 200. The person perceives the depth of the display object 230 from the screen 200 due to the parallax between the eyes. Motion (that is, convergence) is caused in the right and left eyes, whose lines of sight of the display object 230 displayed to be stereoscopically viewed by the offset intersect. The person perceives the depth of the display object 230 also by muscle control of the motions of the eyes. A naked-eye type method such as a lenticular method or a parallax barrier method is used as a method for stereoscopic view. In the lenticular method and the parallax barrier method, a simple configuration in which the screen 200 is covered with a slit or a lenticular lens is used. Accordingly, the lenticular method and the parallax barrier method are also applicable to the transparent display 10. Further, another naked-eye stereoscopic method may be applied or a glasses-type method such as a polarized filter method or a liquid crystal shutter method may be applied. In this embodiment, an arbitrary method of realizing stereoscopic view display in the transparent display 10 is applied.

Figure 2:
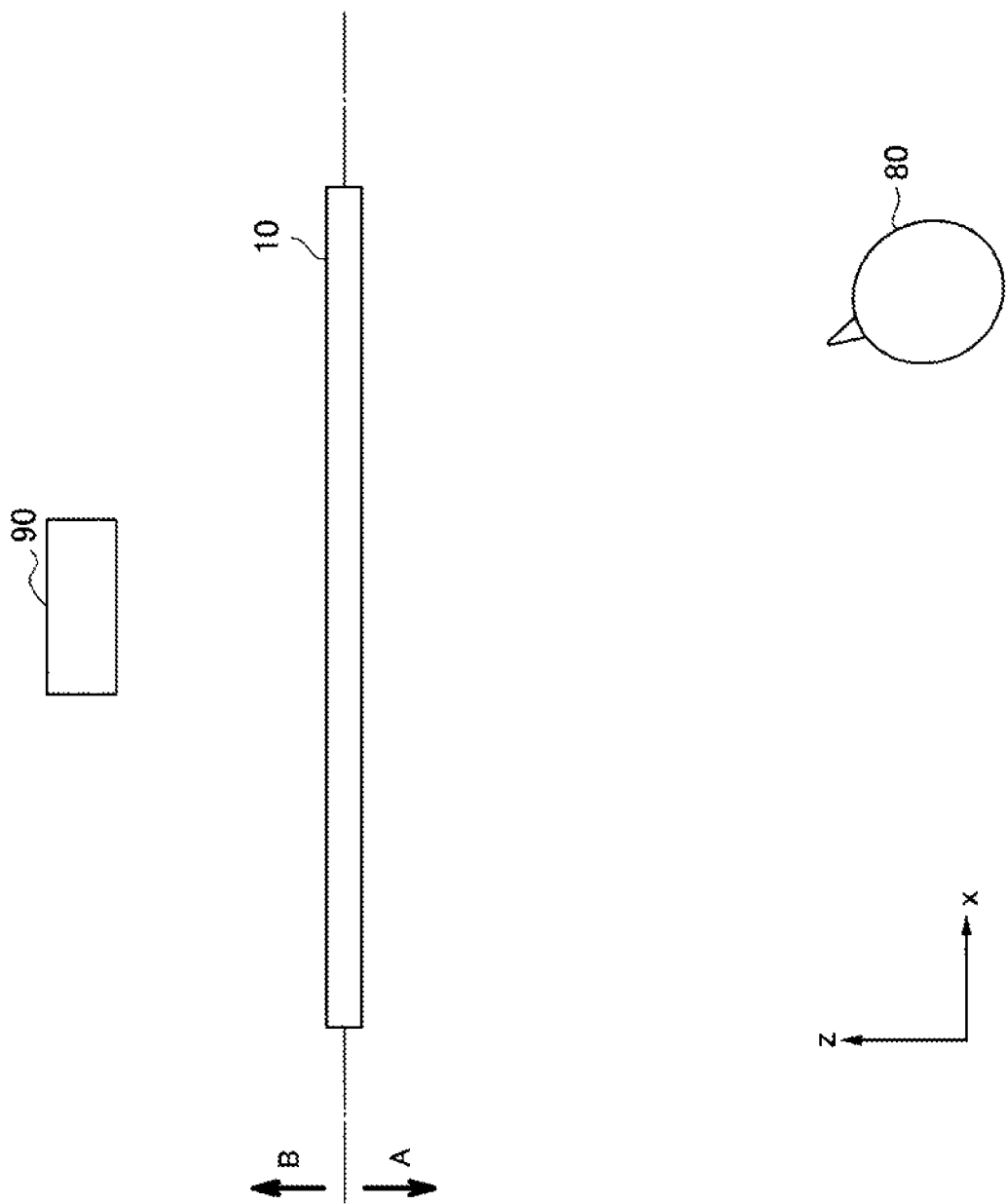
FIG. 2 is a diagram illustrating positional relations between a transparent display and a viewpoint and between the transparent display and an object.

FIG. 2 is a diagram illustrating a positional relation among the transparent display 10, a viewpoint 80, and the object 90. In this embodiment, the viewpoint 80 is located on the side of the first surface (that is, a direction A in FIG. 2) of the transparent display 10 and the object 90 is located on the side of the second surface (that is, a direction B in FIG. 2) of the transparent display 10. The display of the transparent display 10 is controlled based on a positional relation among the three. Here, the viewpoint means both eyes of a person. The viewpoint may mean a camera (or a lens of a camera). That is, the viewpoint refers to any agent that perceives or recognizes the object 90 and the display object 230. Here, the object 90 may be a stationary object. Further, the object 90 may be operated or may be an independently moving object such as a person, an animal, or a machine.

Camera 20

The camera 20 images a person located on the side of the first surface (that is, the direction A in FIG. 2) of the transparent display 10. As shown in FIG. 1, the camera 20 is provided, for example, at the central position of the transparent display 10 on the xz plane (that is, the horizontal plane)

shown in FIG. 1. As will be described later, the camera 20 has, for example, a horizontal image angle $2\alpha$ and a vertical image angle $2\beta$. The horizontal and vertical image angles are used to recognize the direction of the viewpoint 80. The camera 20 outputs a digital image obtained through imaging to the display control apparatus 100. Further, when the viewpoint means an agent (for example, a camera) other than the eyes of a person, the camera 20 may image this agent.

Display Control Apparatus 100

The display control apparatus 100 controls the display of the transparent display 10. In this embodiment, the display control apparatus 100 acquires position information indicating a relative positional relation between the transparent display 10 and the viewpoint 80 or the object 90, and then controls the display of the transparent display 10 based on the position information. Thus, it is possible to realize the display of the transparent display suitable for viewing an object through the transparent display from a viewpoint. The display control apparatus 100 will be described in detail in "2. Configuration of Display Control Apparatus."

Other Configuration

The display control system 1 may further include other elements in addition to the transparent display 10, the camera 20, and the display control apparatus 100. For example, the display control system 1 may include not only the camera 20 but also an additional camera that images an object 90. Further, the additional camera may be a camera that can measure the distance of an object. To measure the distance of the object 90, a camera such as a stereo camera or a camera capable of measuring the distance of an object, such as a time-of-flight (TOF) range image sensor, is used as the additional camera. Even when the position of the object 90 is moved, the position of the object 90 can be recognized by the additional camera. Further, the camera 20 may also be a camera capable of measuring the distance.

The display control system 1 may further include a separate apparatus that supplies information to recognize the position of the viewpoint 80 or the object 90 instead of the camera 20 or the above-described additional camera. The separate apparatus may be an infrared sensor or a pressure sensor provided on the side of the first surface (that is, the direction A in FIG. 2) or the side of the second surface (the direction B in FIG. 2) of the transparent display 10. The separate apparatus May be a reception apparatus that receives radio waves from a transmitter disposed in the vicinity of the view point 80 or the object 90 and generates information used to specify the position of the viewpoint 80 or the object 90 based on the received radio waves. The display control system 1 according to this embodiment may include any apparatus that supplies information used to specify the position or the distance of the viewpoint 80 or the object 90.

The display control system 1 may include an apparatus that recognizes the position of the viewpoint 80 or the object 90 based on a digital image from the camera 20 or information from another apparatus. In this case, the display control apparatus 100 may not have a function of recognizing the position of the viewpoint 80 or the object 90. The display control system 1 may include an apparatus that generates a display image to be displayed on the transparent display 10 under the control of the display control apparatus 100. In this case, the display control apparatus 100 may not have a function of generating the display image.

The display control system 1 may further include an input apparatus that operates the display object 230 displayed on the transparent display 10. Examples of the input apparatus include a mouse, a keyboard, a touch panel, a button, a switch, a lever, a remote controller, and an external connection apparatus, such as a cellular phone or a PDA, corresponding to an operation of the transparent display 10.

2. Configuration of Display Control Apparatus

Next, the configuration of the display control apparatus 100 according to this embodiment will be described with reference to FIGS. 3 to 24.

2.1. Logical Configuration of Display Control Apparatus

Figure 3:
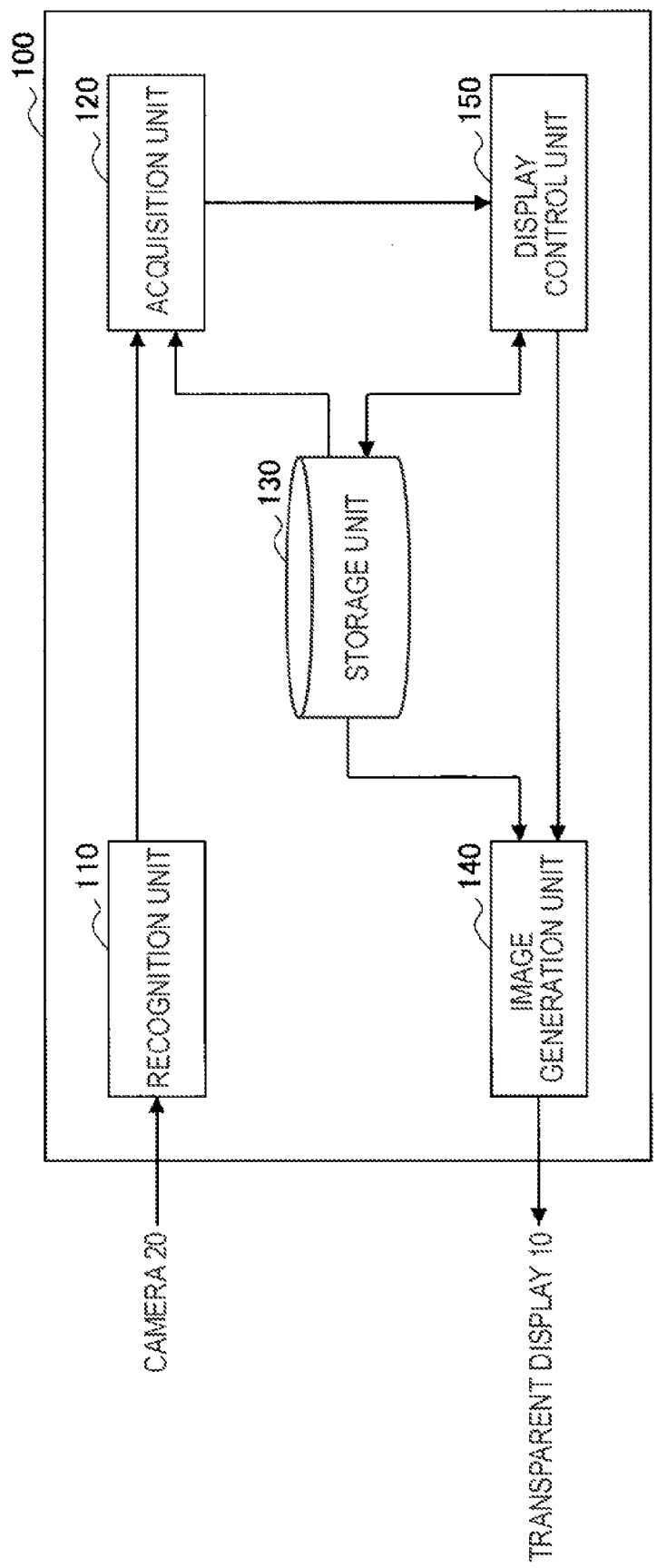
FIG. 3 is a block diagram illustrating an example of a logical configuration of a display control apparatus according to an embodiment.

First, an example of the logical configuration of the display control apparatus 100 according to this embodiment will be described with reference to FIGS. 3 to 6. FIG. 3 is a block diagram illustrating an example of the logical configuration of the display control apparatus 100 according to this embodiment. Referring to FIG. 3, the display control apparatus 100 includes a recognition unit 110, an acquisition unit 120, a storage unit 130, an image generation unit 140, and a display control unit 150.

Recognition Unit 110

The recognition unit 110 recognizes the relative position of the viewpoint 80 with respect to the transparent display 10 or the object 90. For example, the position of the viewpoint 80 is the position of both eyes of the person located on the side of the first surface of the transparent display 10. For example, the recognition unit 110 recognizes the relative position of the viewpoint 80 with respect the transparent display 10 or the object 90 from a digital image acquired from the camera 20. For example, the recognition unit 110 recognizes the relative position of the viewpoint 80 with respect to the transparent display 10 or the object 90 by recognizing the relative position of the face of the person. Here, a method of recognizing the position of the viewpoint 80 by recognizing the position of the face of the person will be described. Accordingly, in the recognition of the position, the viewpoint 80 is substantially identical with the face of the person.

For example, the recognition unit 110 recognizes the relative position of the viewpoint 80 with respect to the transparent display 10 by specifying the direction and the distance of the viewpoint 80 from the center of the transparent display 10 on the xz plane (that is, the horizontal surface) shown in FIG. 1.

First, a method of specifying the direction of the viewpoint 80 from the center of the transparent display 10 will be described. FIG. 4 is a diagram illustrating the method of specifying the direction of the viewpoint 80 on the xz plane (horizontal plane). Referring to 4-1 of FIG. 4, the camera 20 has a horizontal image angle of $2\alpha$. The viewpoint 80 is located at an angle deviated by $\theta_1$ to the left from the center of the horizontal image angle of the camera 20. Here, as shown in FIG. 1, the camera 20 is provided at the same position as the center of the transparent display 10 on the xz plane. Accordingly, on the xz plane, the viewpoint 80 is located at an angle deviated only $\theta_1$ from the straight line which is parallel to the z axis and passes through the center of the transparent display 10. Accordingly, the direction of the viewpoint 80 from the center of the transparent display 10 on the xz plane is expressed by the angle $\theta_1$. Further, the angle $\theta_1$ may be expressed as a positive value when the viewpoint 80 is deviated to the left, and expressed as a negative value when the viewpoint 80 is deviated to the right, or vice versa.

Referring to 4-2 of FIG. 4, a digital image 22 imaged by the camera 20 is shown. The recognition unit 110 detects the face in the digital image 22 and obtains a distance $d_1$ of the face (that is, the viewpoint 80) from the center of the digital image 22. For example, when it is assumed that the horizontal width of the digital image 22 is 1 (that is, half of the horizontal width is 0.5), the distance $d_1$ is a positive number less than 0.5. In this case, the following expression is satisfied.

[Equation 1]

$$\frac{\tan\theta_1}{d_1} = \frac{\tan\alpha}{0.5} \quad \text{(Equation 1)}$$

When Equation 1 above is modified, the following equation can be obtained.

[Equation 2]

$$\theta_1 = a\tan\left(\frac{d}{0.5/\tan\alpha}\right) \quad \text{(Equation 2)}$$

Accordingly, the recognition unit 110 can obtain the angle $\theta_1$ using the distance $d_1$ and the given horizontal image angle α. Thus, the recognition unit 110 can specify the direction $\theta_1$ of the viewpoint 80 from the center of the transparent display 10 on the xz plane.

Next, a method of specifying the distance of the viewpoint 80 from the center of the transparent display, 10 will be described. The recognition unit 110 can obtain the distance $D_1$ of the viewpoint 80 from the camera 20 in the z-axis direction from the size of the face of the person detected from the digital image 22. For example, information (for example, a lookup table) in which the size of the face of person in the digital image matches the distance $D_1$ of the viewpoint 80 from the camera 20 in the z-axis direction is stored in advance. Then, the recognition unit 110 obtains the distance matching the size from the detected size of the face of the person. Further, not only the size of the person but also information regarding the gap between the eyes of the person, the estimated age of the person, or the like may be used to obtain the distance $D_1$ of the viewpoint 80 from the camera 20. Here, the camera 20 is provided at the same position as the center of the transparent display 10 on the xz plane, as shown in FIG. 1. The distance of the viewpoint 80 from the center of the transparent display 10 is set to the distance $D_1$, which is the same as the distance of the viewpoint 80 from the camera 20, in the z-axis direction. Accordingly, the distance of the viewpoint 80 from the center of the transparent display 10 in the z-axis direction is expressed by the distance $D_1$. Thus, the recognition unit 110 may specify the distance $D_1$ of the viewpoint 80 from the center of the transparent display 10 in the z-axis direction. Further, when the center of the transparent display 10 is not the same as the position of the camera 20 on the xz plane, but the offset distance between the transparent display 10 and the position of the camera 20 is given, the distance between the transparent display 10 and the viewpoint 80 may be specified by performing correction by the offset distance.

Figure 5:
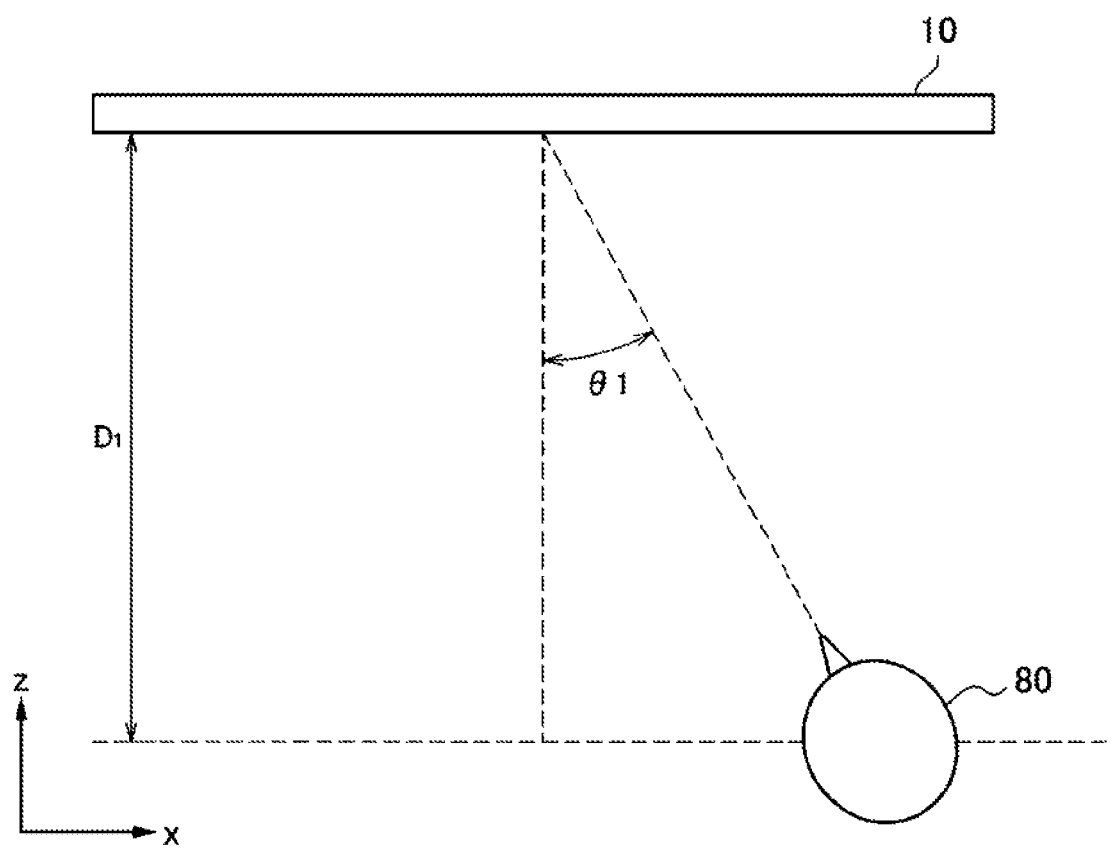
FIG. 5 is a diagram illustrating a method of specifying the position of the viewpoint on the xz plane (horizontal plane)

As shown in FIG. 5, the recognition unit 110 recognizes the relative position of the viewpoint 80 with respect to the transparent display 10 on the xz plane by specifying the direction $\theta_1$ and the distance $D_1$ of the viewpoint 80 from the center of the transparent display 10.

Figure 6:
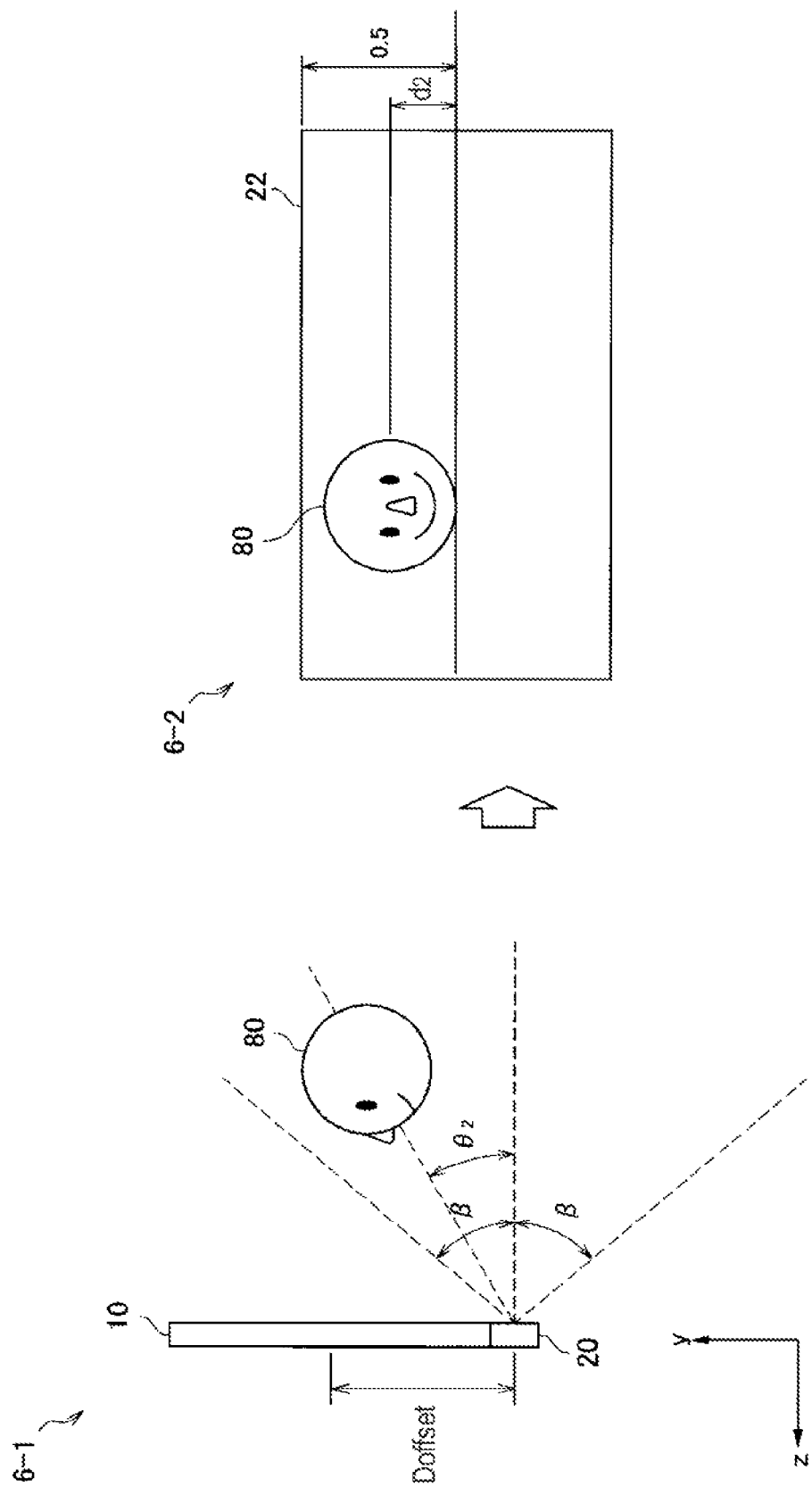
FIG. 6 is a diagram illustrating a method of specifying the direction of the viewpoint on a yz plane.

The relative position of the viewpoint 80 with respect to the transparent display 10 on the xz plane has been described with reference to FIGS. 4 and 5. However, the relative position of the viewpoint 80 with respect to the transparent display 10 may be recognized even on the yz plane. On the yz plane, as shown in FIG. 6, a vertical image angle 2β may be used instead of the horizontal image angle 2α and a distance $d_2$ in the digital image 22 may be obtained instead of the distance $d_1$ in the digital image 22. Thus, a direction $\theta_2$ of the viewpoint 80 with respect to the camera 20 can be obtained by the above-described method. The distance $D_1$ (that is, the distance in the z-axis direction) of the viewpoint 80 from the center of the camera 20 (or the transparent display 10) is likewise used even on the yz plane. On the yz plane, however, the position of the camera 20 and the position of the center of the transparent display 10 are different from each other by an offset distance $D_{offset}$ in the y-axis direction. Accordingly, a position corrected in the y-axis direction by the offset distance $D_{offset}$, which is obtained from the direction $\theta_2$ and the distance $D_1$, from the relative position of the viewpoint 80 with respect to the camera 20 becomes the relative position of the viewpoint 80 with respect to the transparent display 10 on the yz plane.

The recognition of the relative position of the viewpoint 80 with respect to the transparent display 10 has been described above, but the relative position of the viewpoint 80 with respect to the object 90 may be recognized. Further, although the recognition of the relative position of the viewpoint 80 with respect to the transparent display 10 based on the digital image has been described, the embodiment of the present disclosure is not limited thereto. For example, the relative position of the viewpoint 80 with respect to the transparent display 10 may be recognized based on information obtained from another apparatus, such as an infrared sensor, a pressure sensor, or a reception apparatus other than the camera, that receives radio waves from a transmitter included in the object 90 or disposed in the vicinity of the viewpoint 80.

The recognition unit 110 may recognize the relative position of the object 90 with respect to the transparent display 10 or the viewpoint 80. For example, the recognition unit 110 may recognize the relative position of the object 90 with respect to the transparent display 10 or the viewpoint 80 from a digital image obtained from an additional camera different from the camera 20 or information obtained from another apparatus such as an infrared sensor or a pressure sensor. The recognition unit 110 may also recognize the size of the object 90.

Further, the recognition unit 110 may recognize a distance (hereinafter referred to as a "touch distance") between the transparent display 10 and a person or a part (for example, a hand) of the body of the person located on the side of the first surface of the transparent display from the digital image obtained from the camera 20 or the information obtained from another apparatus such as an infrared sensor or a pressure sensor.

Acquisition Unit 120

The acquisition unit 120 acquires position information indicating the relative positional relations between the transparent display 10 and the viewpoint 80 located on the side of the first surface (that is, the direction A in FIG. 2) of the transparent display 10 and between the transparent display 10 and the object 90 located on the side of the second surface (that is, the direction B in FIG. 2) of the transparent display 10. The position information is arbitrary information indicating the relative positional relations between the transparent display 10 and the viewpoint 80 and between the transparent display 10 and the object 90. For example, the position information is information indicating the relative position of the viewpoint 80 with respect to the transparent display 10 and the relative position of the object 90 with respect to the transparent display 10. In this case, for example, as shown in FIG. 5, the relative position of the viewpoint 80 with respect to the transparent display 10 is expressed by the direction $\theta_1$ and the distance $D_1$ of the viewpoint 80 from the center of the transparent display 10. Instead, the position information may be information indicating the relative position of the viewpoint 80 with respect to the object 90 and the relative position of the object 90 with respect to the transparent display 10. Further, the position information may be information including the positions of the transparent display 10, the viewpoint 80, and the object 90 with respect to the origin set at one position. The positions of the transparent display 10, the viewpoint 80, and the object 90 are not limited to the central points, but may be any point among the central points or any point in the vicinity of the central points. Any point may include two or more points or may be in the range including two or more points. The position information may be information including the size of the object 90. The position information may include not only the relative positional relation on the xz plane (that is, the horizontal surface) but also the relative position information on the yz plane.

More specifically, for example, the acquisition unit 120 acquires the relative position of the viewpoint 80 with respect to the transparent display 10 or the object 90 from the recognition unit 110. Further, for example, the acquisition unit 120 acquires the relative position of the object 90 with respect to the transparent display 10 from the storage unit 130. When the recognition unit 110 recognizes the relative position of the object 90 with respect to the transparent display 10, the acquisition unit 120 may acquire the relative position of the object 90 with respect to the transparent display 10 from the recognition unit 110. The acquisition unit 120 may additionally acquire the size of the object 90.

The acquisition unit 120 may additionally acquire a touch distance as a first distance between the transparent display 10 and a person located on the side of the first surface of the transparent display 10 or a part of the body of the person. For example, the acquisition unit 120 may acquire the touch distance from the recognition unit 110.

Storage Unit 130

The storage unit 130 stores information temporarily or permanently stored for the display control apparatus 100. In this embodiment, for example, the storage unit 130 stores the relative position of the object 90 with respect to the transparent display 10. For example, the relative position of the object 90 with respect to the transparent display 10 is set by an administrator of the display control apparatus 100 and is stored in the storage unit 130. Further, the relative position of the object 90 with respect to the transparent display 10 may be recognized by the recognition unit 110 and may be stored in the storage unit 130. In this case, the recognition unit 110 may reduce the frequency of the recognition on the assumption that the object 90 does not frequently move. The storage unit 130 may additionally store the size of the object 90. The size of the object 90 may be set by the administrator of the display control apparatus 100 or may be recognized by the recognition unit 110.

The storage unit 130 stores information necessary for generating the display image to be displayed on the screen 200 of the transparent display 10. For example, the storage unit 130 stores the display position and the display attribute of the display object 230 necessary for displaying the display object 230 included in the display image. The display position and the display attribute of the display object 230 may be determined or modified in the display control of the display control unit 150.

Image Generation Unit 140

The image generation unit 140 generates a display image to be displayed on the screen 200 of the transparent display 10 under the control of the display control unit 150. For example, the image generation unit 140 generates a display image, such as a menu, a figure, text, an icon, or a window, including the display object 230. The image generation unit 140 outputs the display image to the transparent display 10.

When the transparent display 10 is a display apparatus that displays the display object 230 displayed on the screen 200 so as to be stereoscopically viewable, the image generation unit 140 may generate right-eye and left-eye images.

Display Control Unit 150

The display control unit 150 controls the display of the transparent display 10. In this embodiment, the display control unit 150 controls the display of the transparent display 10 particularly based on the position information indicating the relative position of the viewpoint 80 and the object 90 with respect to the transparent display 10. An example of specific display control of the display control unit 150 will be described below in "2.2. Display Control Unit."

2.2. Display Control Unit

Next, first to third examples of the specific display control of the display control apparatus 100 according to this embodiment will be described with reference to FIGS. 7 to 23.

First Example of Display Control

As the first example of the display control, the display control unit 150 controls the display of the transparent display 10 so that the object 90 is viewable from the viewpoint 80 through the screen 200 of the transparent display 10. More specifically, the display control unit 150 determines a region (hereinafter referred to as an "interference region") in the screen 200 of the transparent display 10 based on the position information and controls the display of the transparent display 10 so that the object 90 is viewable from the viewpoint 80 through the interference region.

Figure 7:
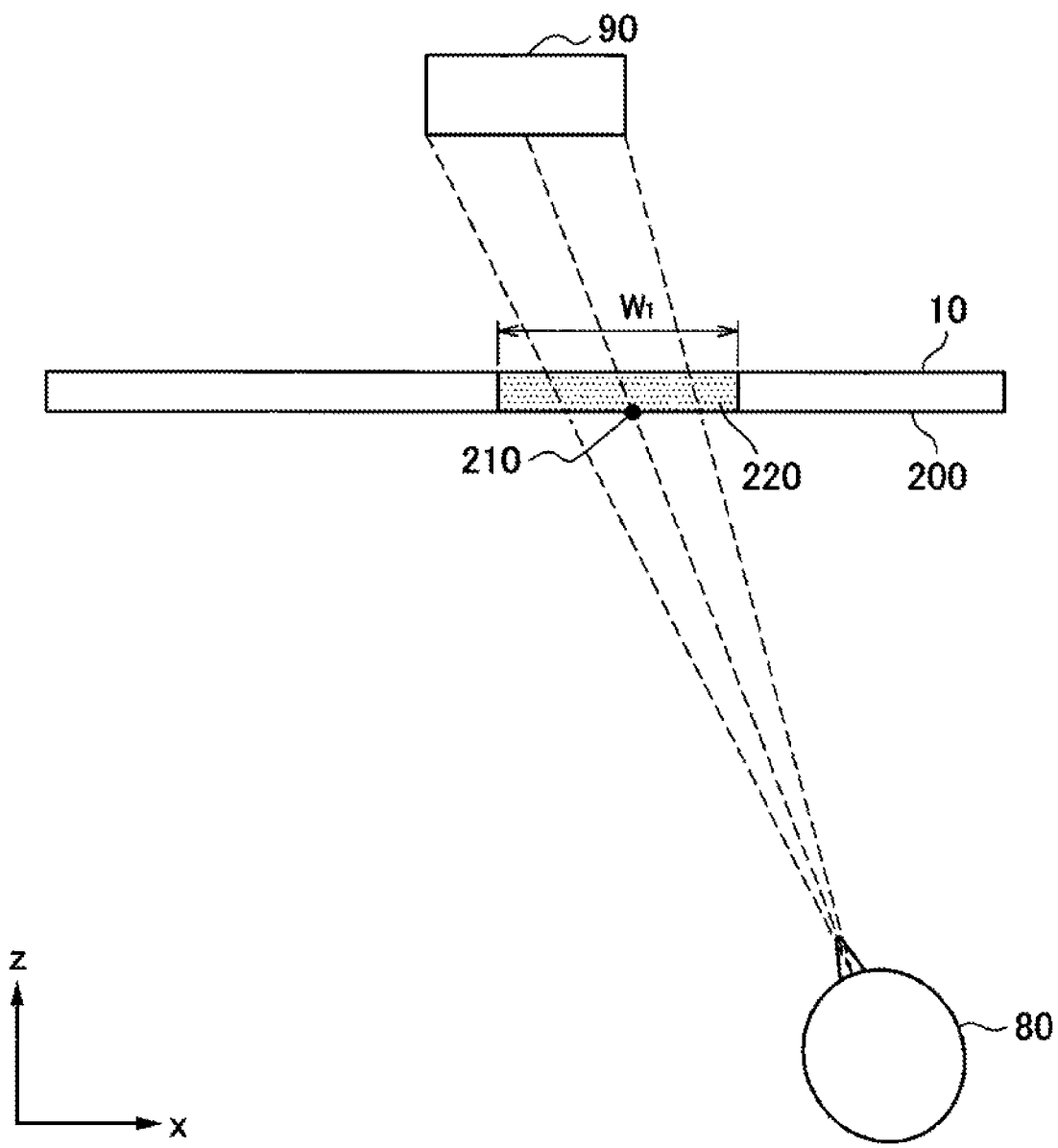
FIG. 7 is a diagram illustrating a first example of an interference region.
Figure 8:
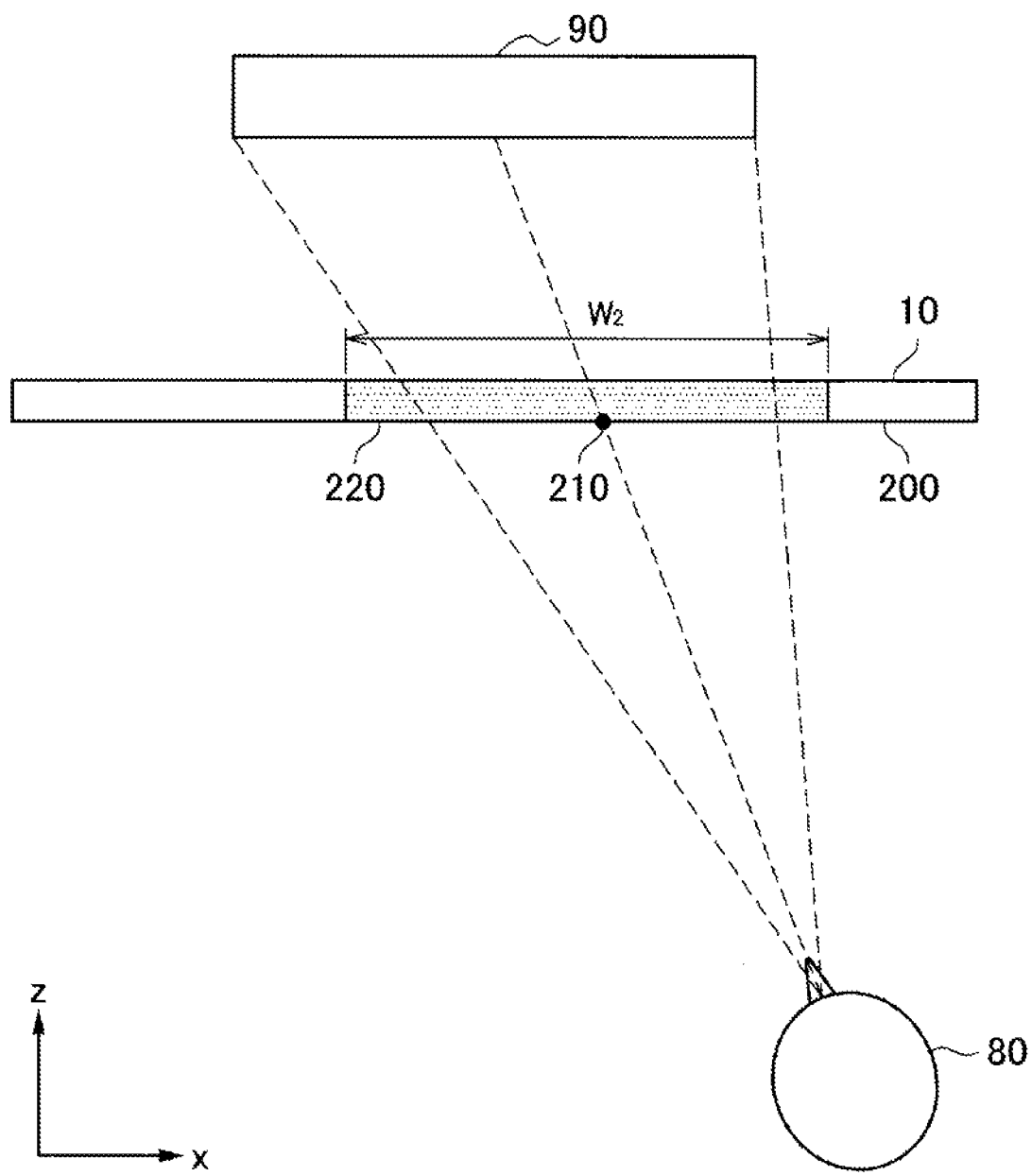
FIG. 8 is a diagram illustrating a second example of the interference region.
Figure 10:
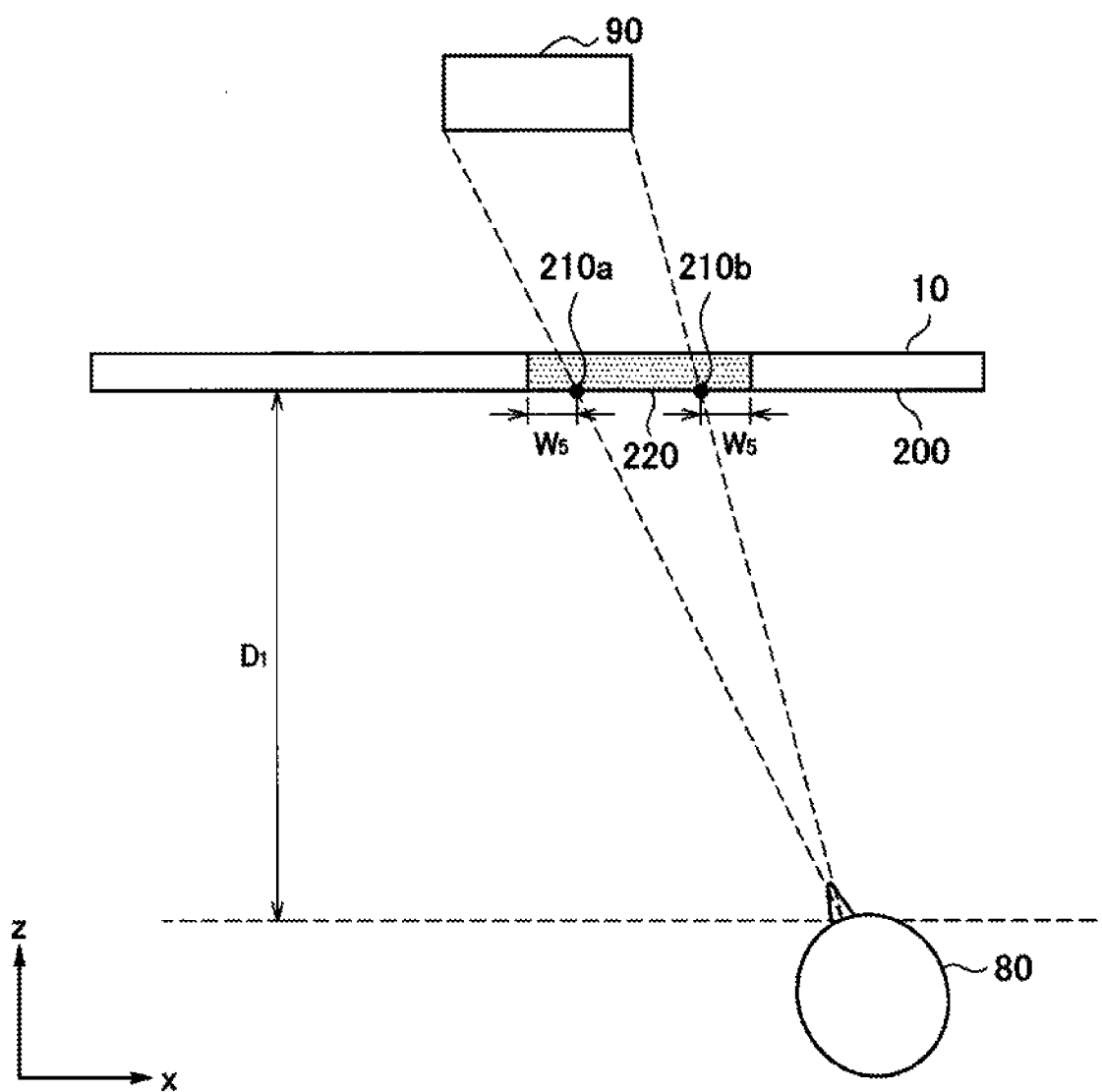
FIG. 10 is a diagram illustrating a fourth example of the interference region.

For example, the determined interference region includes an intersection point between the screen 200 of the transparent display 10 and a straight line passing through the position of the viewpoint 80 and the position of the object 90 in the position information or is present around the intersection point. FIGS. 7 to 10 are diagrams illustrating first to fourth examples of the interference region. Referring to FIG. 7, for example, the interference region 220 has a width $W_1$ centered at an intersection point 210 between the screen 200 of the transparent display and the straight line passing through the position of the viewpoint 80 and the position of the object 90. Of course, the interference region 220 may not be centered at the intersection point 210. The width $W_1$ may be changed in accordance with the size of the object 90. Referring to FIG. 8, for example, when a larger object 90 is used, the interference region 220 may have a width $W_2$ wider than the width $W_1$. The width $W_1$ may be changed in accordance with the distance between the transparent display 10 and the viewpoint 80 or the distance between the transparent display 10 and the object 90. Referring to FIG. 9, for example, as shown in 9-1 of FIG. 9, the interference region 220 may have a width $W_3$ narrower than the width $W_1$, when the distance between the transparent display 10 and the viewpoint 80 is smaller. Further, as shown in 9-2 of FIG. 9, for example, the interference region 220 may have a width $W_4$ wider than the width $W_1$, when the distance between the transparent display 10 and the object 90 is smaller. Referring to FIG. 10, for example, the interference region 220 may include two intersection points 210a and 210b between the screen 200 of the transparent display 10 and two straight lines passing through the position of the viewpoint 80 and two positions of the object 90. Here, the two positions of the object 90 are, for example, the positions of both ends of the object 90 in the x-axis direction. The interference region 220 has a width which is the sum of the width between the intersection points 210a and 210b and two widths $W_5$ on the sides. The example in which the interference region 220 includes the intersection point 210 has been described above, but the interference region 220 may be a region excluding the intersection point 210. That is, the interference region 220 may be present around the intersection point. By determining the interference region, a region supposed to be controlled so that the object 90 is viewable from the viewpoint 80 and a region allowed not to be controlled can be separated from each other clearly. As a result, the display of the display object 230 can be controlled at the region supposed to be controlled so that the view of the object 90 is not interrupted, while the display object 230 can be freely displayed at the region allowed not to be controlled. Further, by determining, as the interference region, the region including the intersection point between the screen 200 of the transparent display 10 and the straight line passing through the position of the viewpoint 80 and the position of the object 90 (or the region present in the vicinity of the intersection point), it is possible to obtain the interference region including a region at which the view of the object 90 from the viewpoint 80 is easily interrupted.

Figure 11:
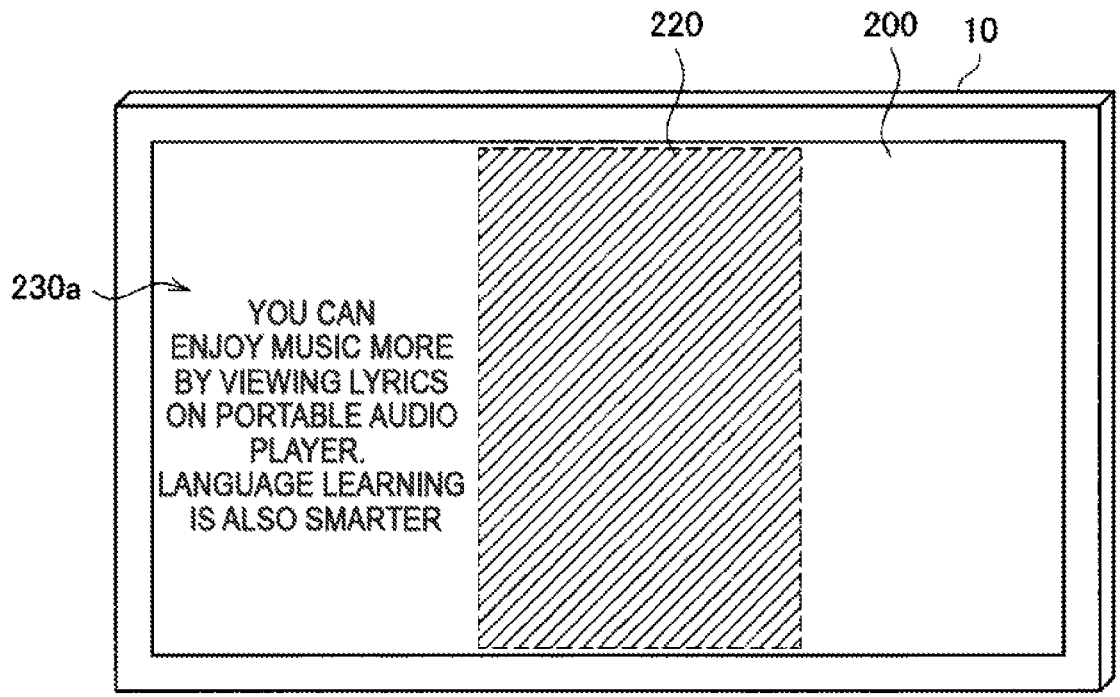
FIG. 11 is a diagram illustrating an example of a display object in the screen including the interference region.
Figure 12:
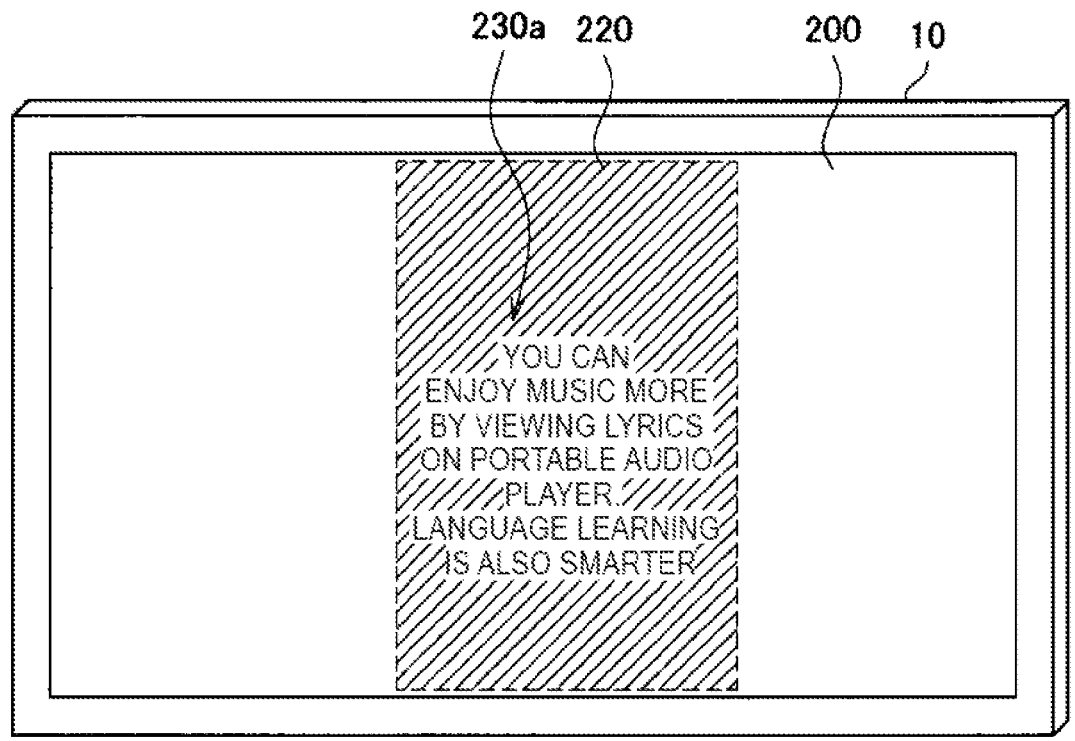
FIG. 12 is a diagram illustrating another example of the display object in the screen including the interference region.

The display control unit 150 controls the display of the transparent display 10 so that the object 90 can be viewed from the viewpoint 80 through the interference region 220 by various methods. For example, the display control unit 150 may control the display of the transparent display 10 by causing the display object 230 to be not displayed within the determined interference region 220. FIG. 11 is a diagram illustrating an example of the display object 230 in the screen 200 including the interference region 220. Referring to FIG. 11, a display object 230a of text is displayed so as not to be included in the interference region 220. Thus, the object 90 is not hidden by the display object 230 because the display object 230 is not displayed within the interference region 220. That is, even when the display object 230 is displayed on the screen 200 of the transparent display 10; the object 90 remains easily viewable from the viewpoint 80. For example, the display control unit 150 may control the display of the transparent display 10 by setting the display attribute of the display object 230 within the determined interference region 220 as the display attribute in which the object 90 is viewable from the viewpoint 80. The display attribute refers to any attribute, such as a transparency, a color, a display ON/OFF state, a size, a shape, an aspect ratio, or a rotation angle of the display object 230, regarding the display of the display object 230. FIG. 12 is a diagram illustrating another example of the display object 230 in the screen 200 including the interference region 220. Referring to FIG. 12, the display object 230a of text is displayed in such a manner that the transparency is increased in the interference region 220. Instead, the display object 230a may be displayed with a considerably decreased size or with an unnoticeable color. By changing the display attribute of the display object 230 within the interference region 220, the object 90 is scarcely hidden by the display object 230. That is, even when the display object 230 is displayed on the screen 200 of the transparent display 10, the object 90 remains easily viewable from the viewpoint 80. For example, the display control unit 150 may control the display of the transparent display 10 by not displaying the entire display screen (that is, switching the display to an OFF state) in the transparent display 10.

The display object 230 may be a display object of which a display position can be changed through an operation of a user. FIG. 13 is a diagram illustrating an example of the display object moving within the screen 200 including the interference region 220. As shown in 13-1 of FIG. 13, the display position of the display object 230a of text can be changed in a direction C, in which the interference region 220 is present, through an operation such as a touch operation of a user. Then, as shown in 13-2 of FIG. 13, for example, the display object 230a is displayed not in the interference region 220 but in another region. As shown in 13-3 of FIG. 13, for example, the display object 230a is displayed in such a manner that the transparency is increased in the interference region 220. Thus, the object 90 remains easily viewable by the display object of which the display position can be changed by an operation of the user, and an operation is freely performed from the viewpoint 80.

The viewpoint 80 may include two or more viewpoints and the display control unit 150 may control the display of the transparent display 10 so that the object 90 can be viewed from at least one of the two or more viewpoints. FIG. 14 is a diagram illustrating the interference region 220 according to a modified example. As shown in 14-1 of FIG. 14, for example, the display control unit 150 determines an interference region 220a for a viewpoint 80a and an interference region 220b for a viewpoint 80b. Then, the display control unit 150 controls the display of the transparent display 10 so that the object 90 can be viewed from the viewpoints 80a and 80b through the interference regions 220a and 220b, respectively. The object 90 remains easily viewable from two or more viewpoints by this control. The display control unit 150 may determine the interference region (that is, the interference region 220a or 220b) for one of the viewpoints 80a and 80b. The object 90 remains easily viewable from at least one viewpoint by this control, and information indicated by the display object 230 can be delivered to the viewpoint.

The interference region 220 with the width restricted in the horizontal direction (that is, the x-axis direction) of the screen 200 has hitherto been described. However, the display control unit 150 may determine the interference region 220 with a width restricted in a vertical direction (that is, the y-axis direction) of the screen 200. When the position information includes not only the relative positional relation in the horizontal direction but also a relative positional relation in the vertical direction, the width in the vertical direction can be determined by the same method of the width in the horizontal direction. As shown in 14-2 of FIG. 14, for example, the interference region 220 may be a region with a width restricted in the horizontal direction and a width restricted in the vertical direction. Thus, the object 90 remains easily viewable from the viewpoint 80 by the interference region 200 with the width restricted in the horizontal direction and the width restricted in the vertical direction, and the display object 230 can be displayed in a broader region.

The first example of the display control by the display control unit 150 has been described above. However, even when the display object 230 is displayed on the screen 200 of the transparent display 10, the object 90 remains easily viewable from the viewpoint 80 by the display control.

Second Example of Display Control

As the second example of the display control, the display control unit 150 controls the display of the transparent display 10 by determining the display position or the display attribute of the display object 230 displayed on the screen 200 of the transparent display 10 based on the position information.

Figure 15:
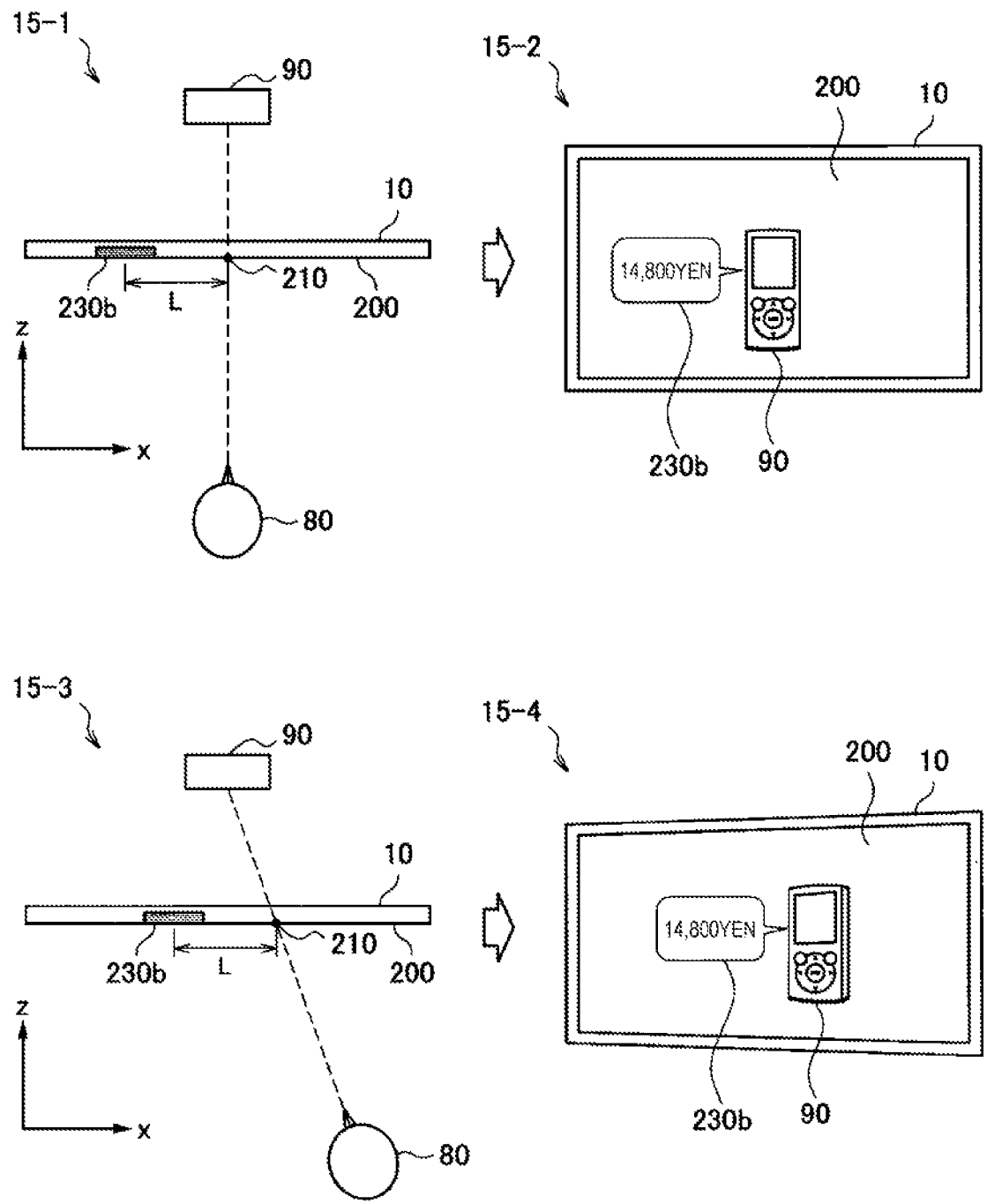
FIG. 15 is a diagram illustrating an example of the display object of which a display position is changed.

For example, the display control unit 150 changes the display position of the display object 230 in accordance with the change in the relative position of the viewpoint 80 with respect to the transparent display 10 or the relative position of the object 90 with respect to the transparent display 10 in the position information. More specifically, for example, the display control unit 150 changes the display position of the display object 230 in accordance with the change in the position of the intersection point between the screen 200 of the transparent display 10 and the straight line passing through the position of the viewpoint 80 and the position of the object 90 in the position information. FIG. 15 is a diagram illustrating an example of the display object of which a display position is changed. As shown in 15-1 and 15-2 of FIG. 15, a display object 230b indicating a price is displayed at a position a predetermined distance L away from the intersection point 210. Thereafter, when the position of the intersection point 210 is moved with the change in the position of the viewpoint 80, as shown in 15-3 and 15-4 of FIG. 15, the position of the display object 230b indicating the price of the object 90 is changed so as to maintain the position the predetermined distance L away from the intersection point 210. Here, the predetermined distance L may be a fixed distance or a distance changed in accordance with the position of the intersection point 210. When the display position of the display object 230 is changed with the change in the position of the viewpoint 80 or the object 90, the display object 230 may be displayed at a position at which the display object 230 is desired to be viewed from the viewpoint 80 irrespective of the position of the viewpoint 80. In particular, for example, the display object 230 can follow the object 90 by changing the display position of the display object 230 in accordance with the change in the intersection point 210. Accordingly, the display object 230 can be displayed in the vicinity of the object 90 irrespective of the position of the viewpoint 80 from which the object 90 is viewed. As a result, both the display object 230 and the object 90 can be easily viewed from the viewpoint 80, and thus the relevance between the display object 230 and the object 90 can be understood more easily.

Figure 16:
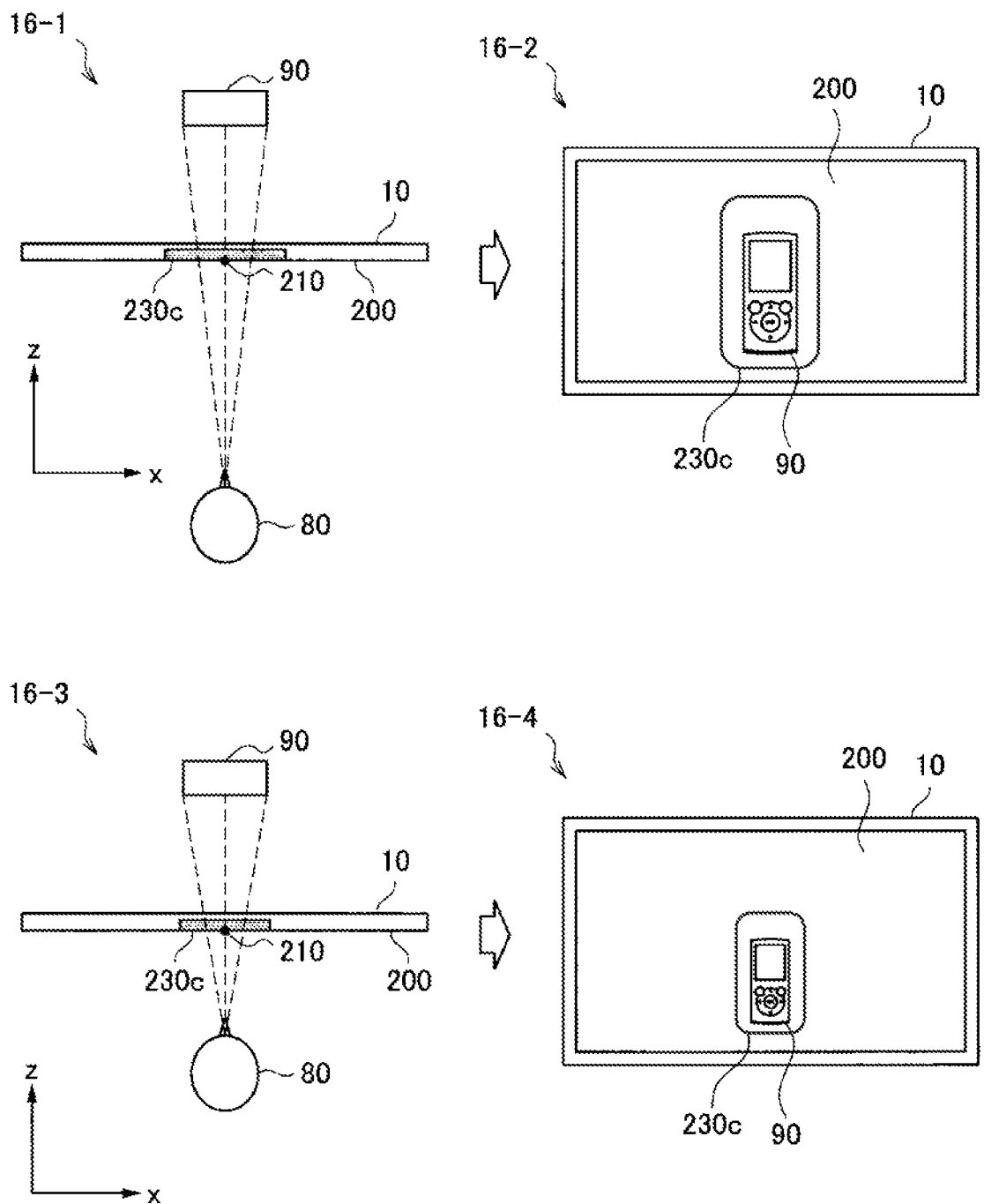
FIG. 16 is a diagram illustrating an example of the display object of which a display attribute is changed.

For example, the display control unit 150 changes the display attribute of the display object 230 in accordance with the change in the relative position of the viewpoint 80 with respect to the transparent display 10 or the relative position of the object 90 with respect to the transparent display 10 in the position information. As described above, the display attribute refers to any attribute, such as transparency, a color, a display ON/OFF state, a size, a shape, an aspect ratio, or a rotation angle of the display object 230, regarding the display of the display object 230. FIG. 16 is a diagram illustrating an example of a display object of which a display attribute is changed. As shown in 16-1 and 16-2 of FIG. 16, a square display object 230c with rounded corners is displayed so as to surround the object 90. Thereafter, when the position of the viewpoint 80 is changed to a position close to the transparent display 10, as shown in 16-3 and 16-4 of FIG. 16, the narrower a range in which the object 90 is viewed from the viewpoint 80 in the screen 200 is, the smaller the size of the square display object 230c with the rounded corners is. Thus, no matter where the viewpoint 80 is located, the display object with the display attribute desired to be viewed from the viewpoint 80 can be displayed by changing the display attribute of the display object 230 in accordance with the change in the position of the viewpoint 80 or the object 90.

The second example of the display control by the display control unit 150 has been described above. A more desirable display of the display object 230 can be realized by the display control no matter what position of the viewpoint 80 the object 90 is viewed from.

Third Example of Display Control

In the third example of the display control, the transparent display 10 displays the display object 230 so as to be stereoscopically displayed and the display control unit 150 determines the display position or the display attribute of the display object 230 for a stereoscopic view based on the position information.

Here, for example, the display position of the display object 230 for the stereoscopic view is a position of the display object 230 perceived from the viewpoint 80 by the stereoscopic view in a three-dimensional space. In this case, the display position of the display object 230 for the stereoscopic view may be the coordinates (for example, coordinates (x, y)) of the screen 200 and the coordinates (for example coordinates (x, y, z)) including the depth (for example, z) in a direction perpendicular to the screen 200 from the screen 200 in a three-dimensional space. From the position of the display object in the three-dimensional space, the image generation unit 140 may specify the display position of a left-eye object in the screen 200 (or a left-eye image) and the display position of a right-eye object in the screen 200 (or a right-eye image). The image generation unit 140 may directly generate the left-eye image including the left-eye object and the right-eye image including the right-eye object by performing rendering for the stereoscopic view based on the position of the display object in the three-dimensional space. Further, the display position of the display object for the stereoscopic view may be the display position of the left-eye object in the screen 200 (or the left-eye image) and the display position of the right-eye object in the screen 200 (or the right-eye image).

Figure 17:
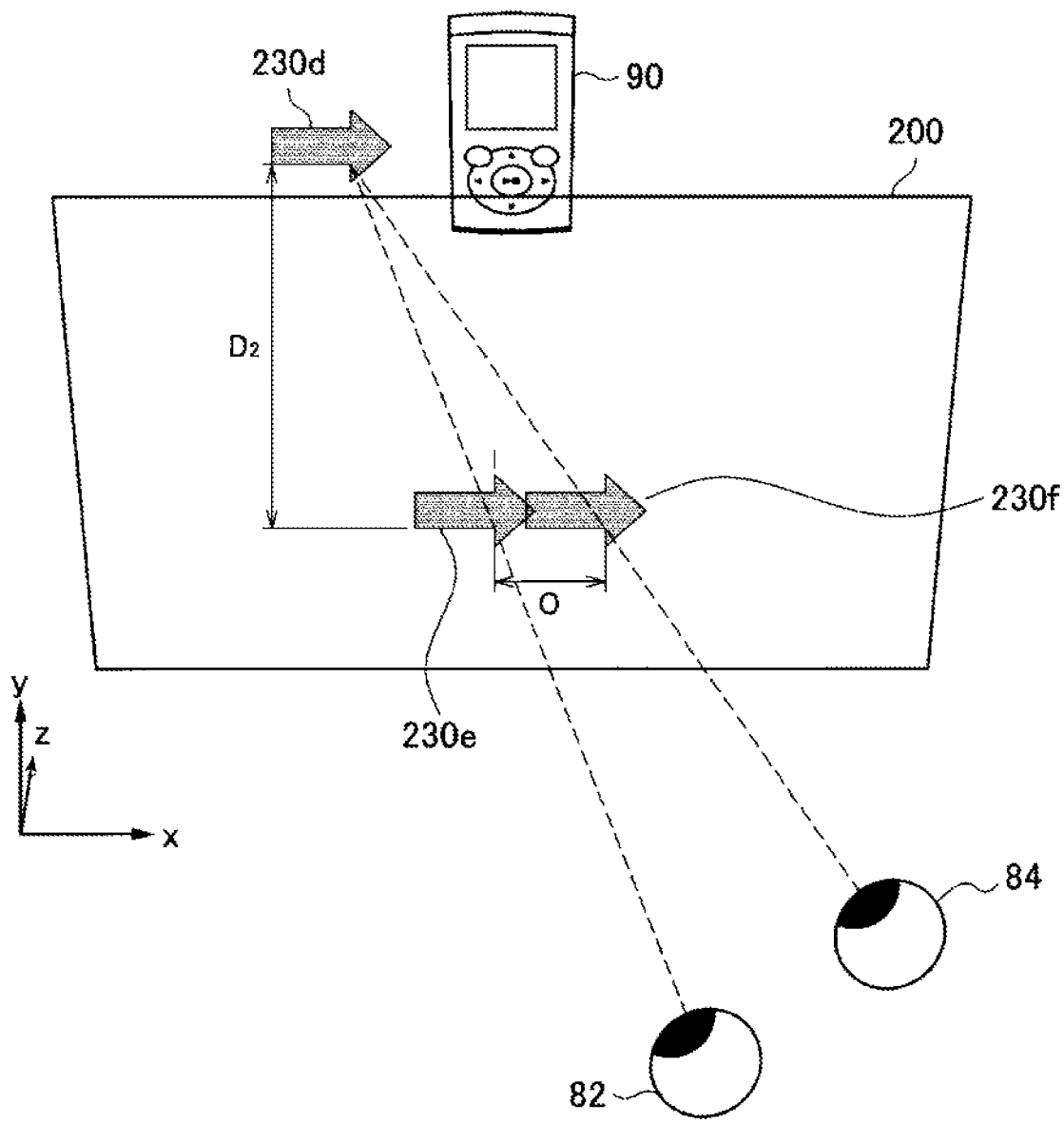
FIG. 17 is a diagram illustrating an example of the display position of the display object for a stereoscopic view.

FIG. 17 is a diagram illustrating an example of the display position of the display object for the stereoscopic view. Referring to FIG. 17, a left-eye object 230e and a right-eye object 230f for a left eye 82 and a right eye 84, respectively, having an offset O are displayed on the screen 200. As a result, parallax between the eyes is generated by the offset O, and thus the left eye 82 and the right eye 84 perceive a depth $D_2$ (that is, $D_2$ in the z axis direction) of a display object 230d from the viewpoint 80. Here, for example, the display position of the display object for the stereoscopic view is a position (for example, the coordinates (x, y, z)) of the display object 230d perceived from the viewpoint 80 by the stereoscopic view in the three-dimensional space. Further, the display position of the display object for the stereoscopic view may be the display position of the left-eye object 230e in the screen 200 (or the left-eye image) and the display position of the right-eye object 230f in the screen 200 (or the right-eye image).

The display attribute for the stereoscopic view refers to any attribute, such as transparency, a color, a display ON/OFF state, a size, a shape, an aspect ratio, or a rotation angle of the display object 230, regarding the display of the display object 230. For example, the shape may be a three-dimensional shape in a space. The rotation angle may be a three-dimensional rotation angle in a space.

Figure 18:
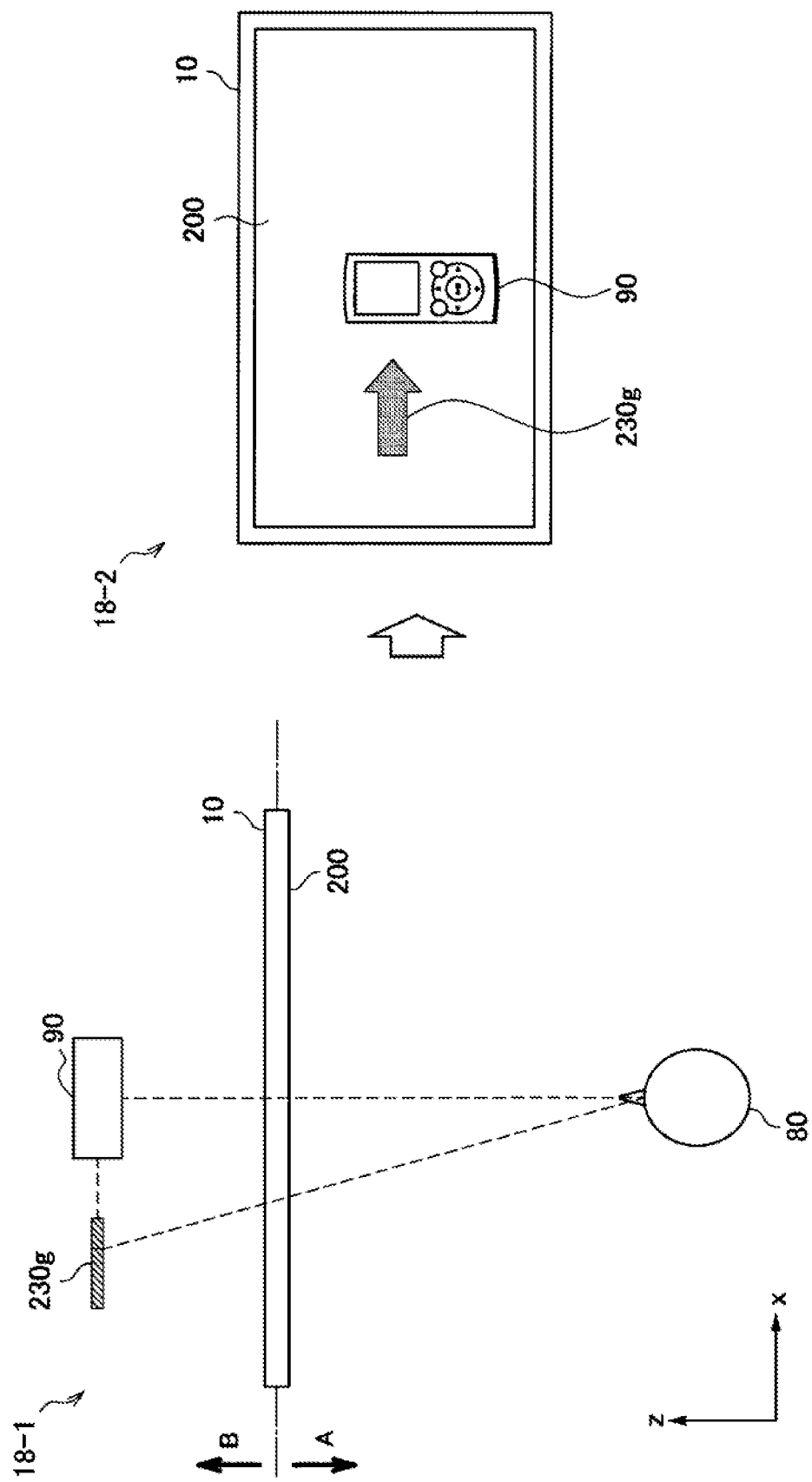
FIG. 18 is a diagram illustrating an example of the display object displayed to be stereoscopically viewed.

For example, the display control unit 150 determines the display position of the display object for the stereoscopic view so that the display object 230 is displayed to be stereoscopically viewed at a depth in a direction (that is, the direction B in FIG. 2 or a positive direction of the z axis) from the side of the first surface to the side of the second surface of the transparent display 10. FIG. 18 is a diagram illustrating an example of the display object 230 displayed to be stereoscopically viewed. Referring to FIG. 18, the display control unit 150 determines the display position of a display object 230g for a stereoscopic view so that the display object 230g is displayed to be stereoscopically viewed at a depth in the direction B (that is, the positive direction of the z axis). When the display position is determined, the depth of the display object 230 perceived from the viewpoint 80 can be made to be closer than the actual depth from the screen 200 at the position occupied by the object 90. As a result, the object 90 and the display object 230 can be viewed from the viewpoint 80 without considerable change in focus. As a result, since the object 90 and the display object 230 can be easily viewed together from the viewpoint 80, it is possible to reduce the fatigue of the eyes of the viewpoint 80.

Figure 19:
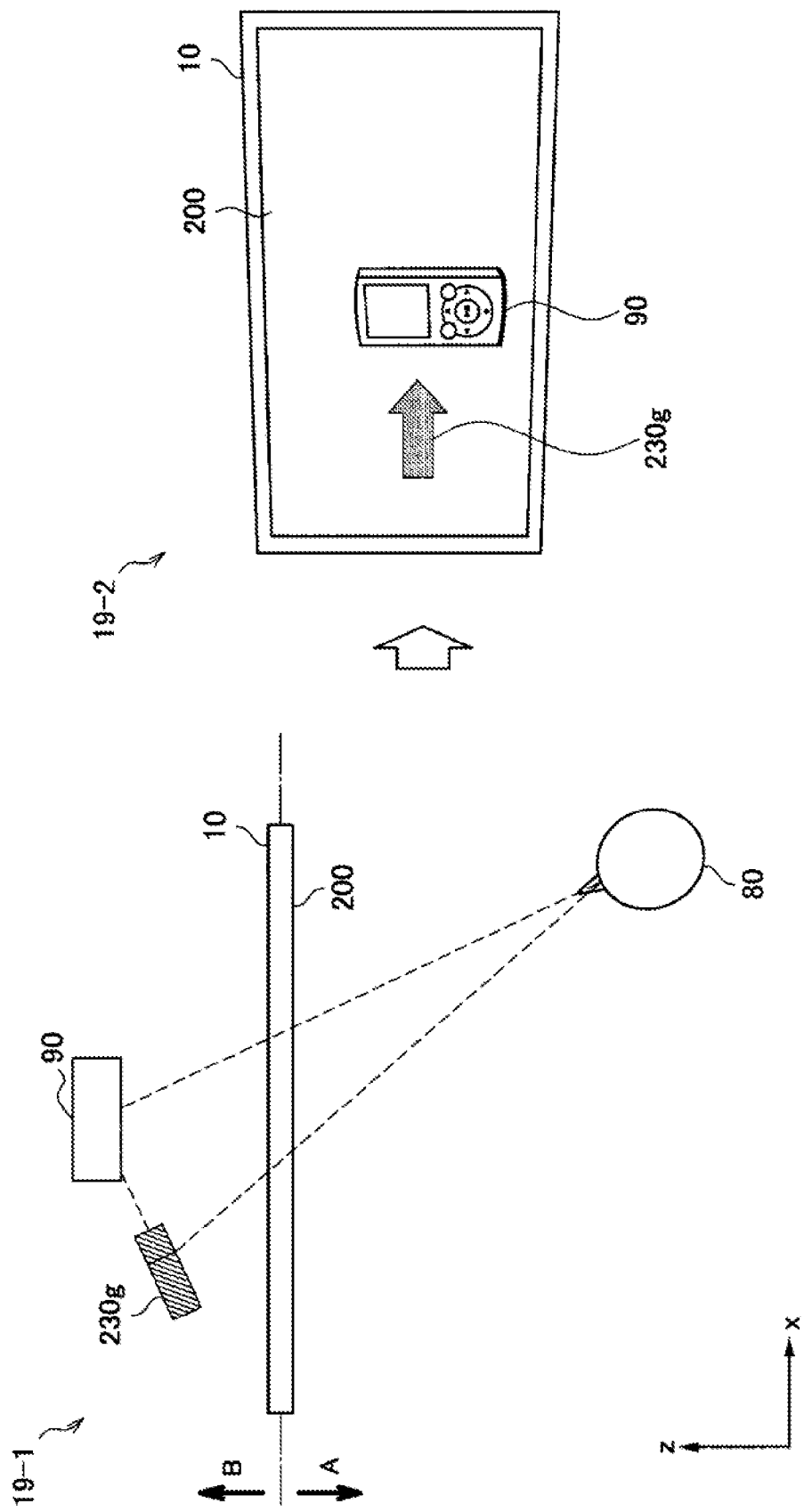
FIG. 19 is a diagram illustrating another example of the display object displayed to be stereoscopically viewed.

For example, the display control unit 150 changes the display position or the display attribute of the display object 230 for the stereoscopic view in accordance with the change in the position of the viewpoint 80 or the position of the object 90 in the position information. Referring to FIG. 19, the position of the viewpoint 80 is changed from the position of the viewpoint 80 in FIG. 18. In this case, the display position and the display attribute (rotational angle) of the display object 230d are changed so as to maintain the state in which the display object 230d indicates the object 90. The display object 230 with the position and the attribute desired to be viewed from the viewpoint 80 in the space can be displayed irrespective, of the position of the viewpoint 80 by changing the display position or the display attribute of the display object 230 for the stereoscopic view in accordance with the change in the position of the viewpoint 80 or the object 90. For example, the display object 230 can follow the object 90 in the three-dimensional space. Accordingly, the display object 230 can be displayed in the vicinity of the object 90 irrespective of the position of the viewpoint 80 from which the object 90 is viewed. As a result, both the display object 230 and the object 90 can be easily viewed from the viewpoint 80, and thus the relevance between the display object 230 and the object 90 can be understood more easily.

Figure 20:
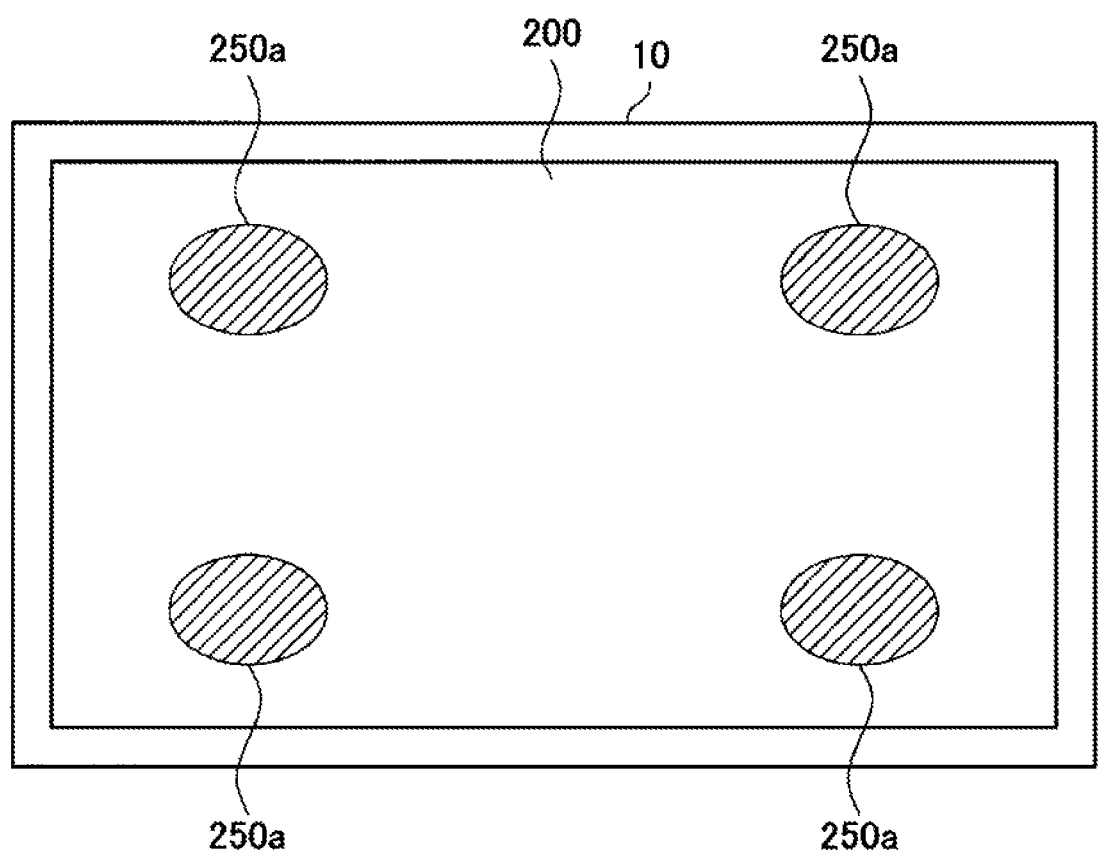
FIG. 20 is a diagram illustrating a first example of a collision prevention object.
Figure 21:
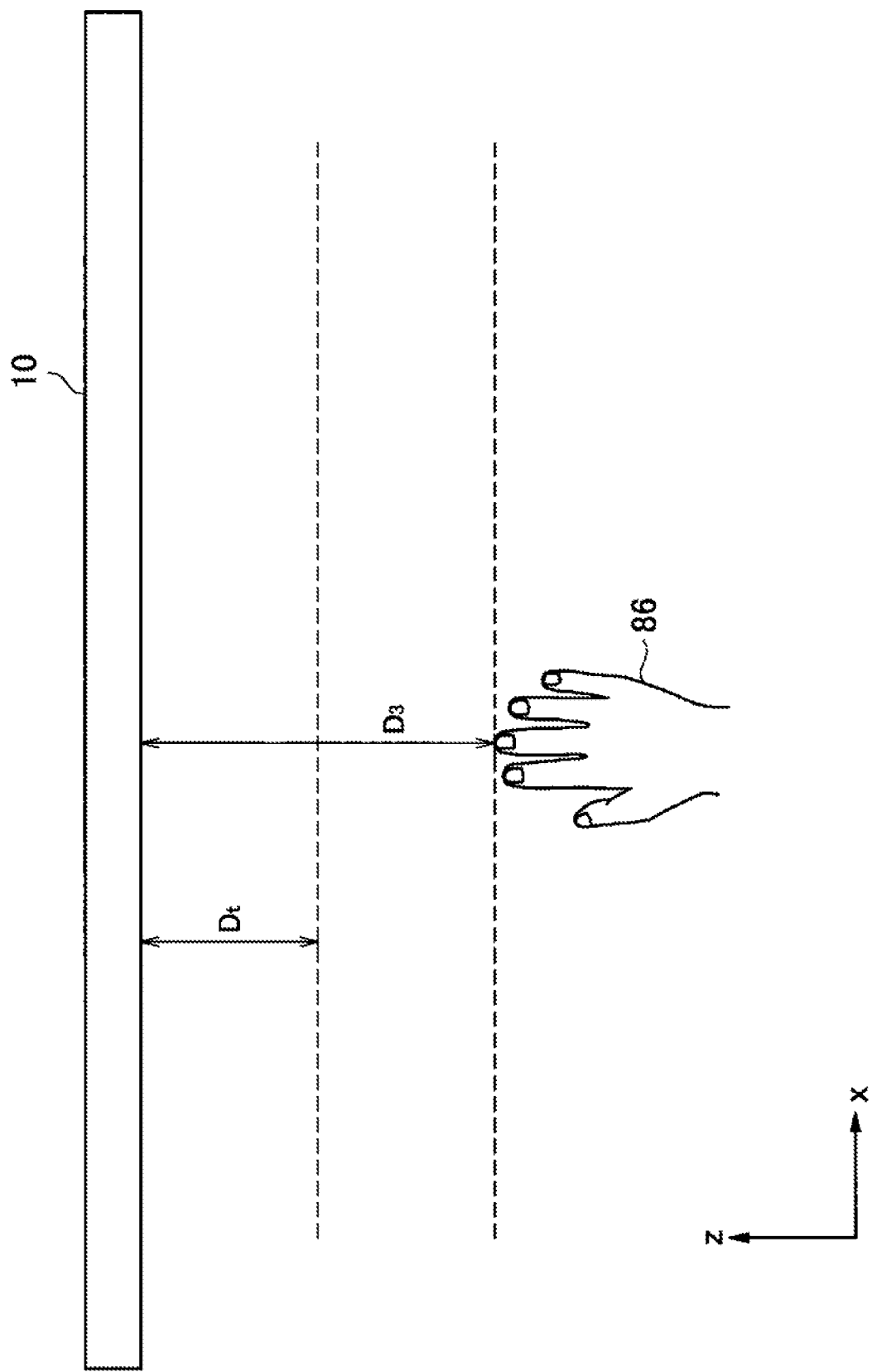
FIG. 21 is a diagram illustrating a timing example of display of the collision prevention object.
Figure 22:
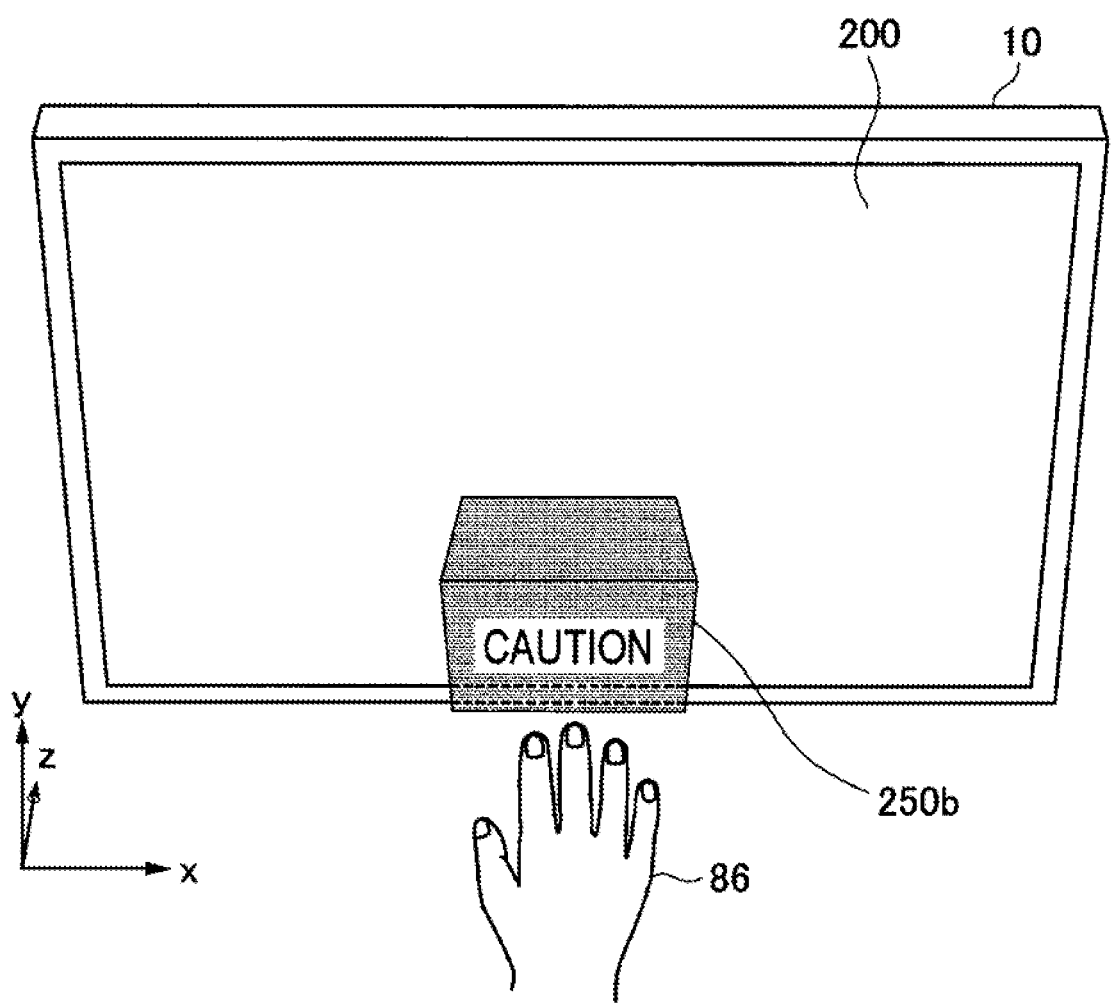
FIG. 22 is a diagram illustrating a second example of the collision prevention object.

The display control unit 150 may cause a display object (hereinafter referred to as a "collision prevention object") to be displayed to make a person located on the side of the first surface of the transparent display 10 aware of the presence of the transparent display 10. FIG. 20 is a diagram illustrating a first example of the collision prevention object. Referring to FIG. 20, for example, four circular stationary collision prevention objects 250a are displayed on the display 200 of the transparent display 10. Further, the display control unit 150 may cause the collision prevention object 250 to be displayed in accordance with a touch distance which is the distance between the transparent display 10 and the person or a part (for example, a hand) of the body of the person. FIG. 21 is a diagram illustrating a timing example of the display of the collision prevention object 250. Referring to FIG. 21, for example, the collision prevention object 250 is displayed when a touch distance $D_3$ is less than a predetermined threshold value $D_t$. FIG. 22 is a diagram illustrating a second example of the display of the collision prevention object. Referring to FIG. 22, for example, a collision prevention object 250b popping up dynamically so as to be perceived by the person may be displayed on the screen 200 of the transparent display 10 when the touch distance $D_3$ is less than the predetermined threshold value $D_t$. Thus, the display of the collision prevention object 250 can prevent a situation in which the person-collides with the transparent display 10 without being aware of the presence of the transparent display 10 when attempting to touch the object 90. Further, by causing the collision prevention object 250 to be displayed in accordance with the touch distance, no collision prevention object can be displayed when there is no danger of collision. As a result, since the display object 230 can be displayed in a broader range, it is possible to ensure that the person easily views the object 90 from the viewpoint 80.

Figure 23:
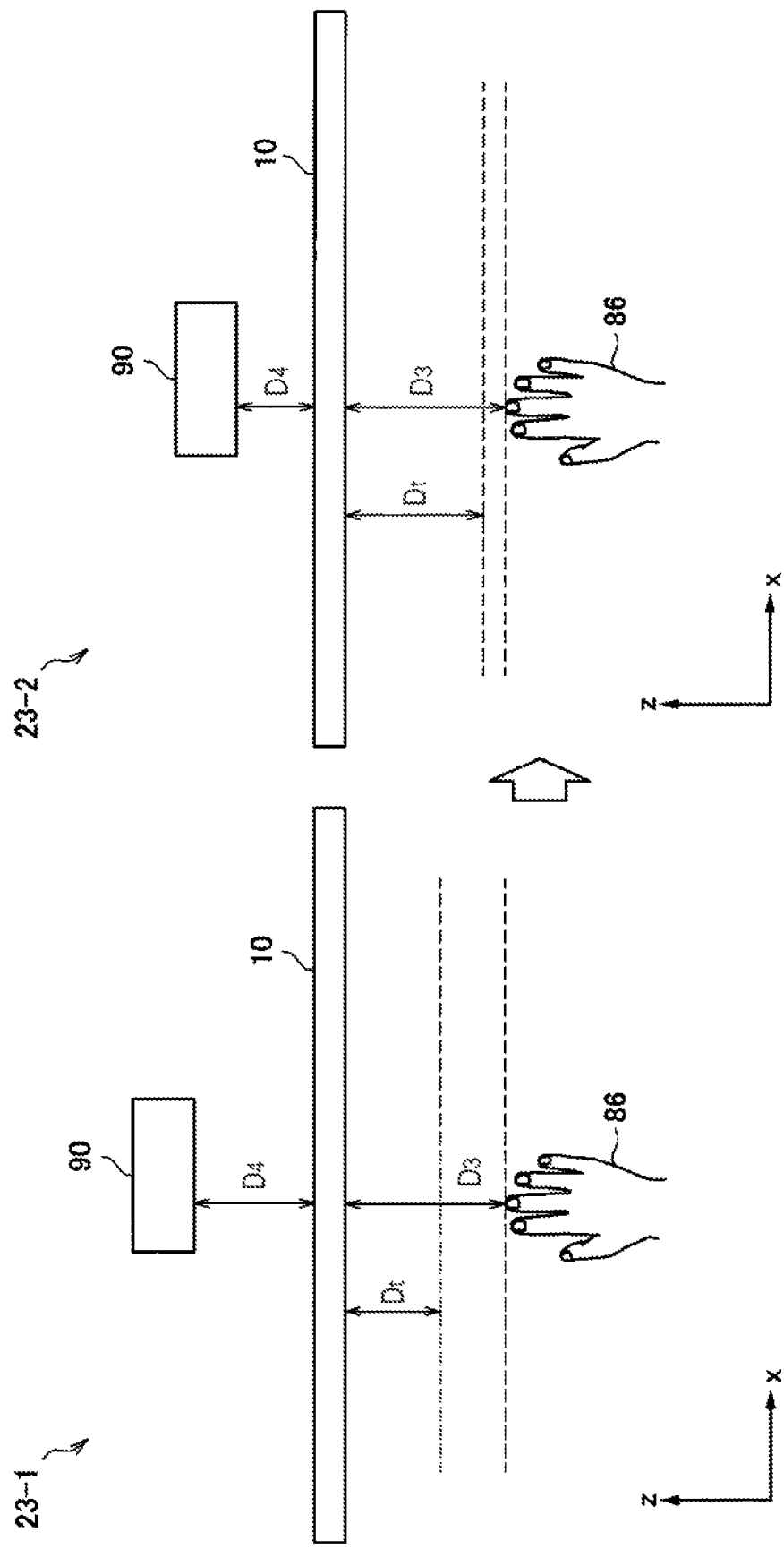
FIG. 23 is a diagram illustrating a timing example of display of a collision prevention object in accordance with the position of an object.

The display control unit 150 may cause the collision prevention object 250 to be displayed to the person even when the shorter the distance (hereinafter referred to as an "object disposition distance") between the positions of the transparent display 10 and the object 90 in the position information is, the longer the touch distance is. FIG. 23 is a diagram illustrating a timing example of the display the collision prevention object 250 in accordance with the position of the object 90. Referring to FIG. 23, the predetermined threshold value $D_t$ of the touch distance $D_3$ is larger when an object disposition distance $D_4$ is smaller, as in 23-2 of FIG. 23, than when the object disposition distance $D_4$ is larger, as in 23-1 of FIG. 23. In general, a person feels that it is easier to touch the object 90 with his or her hand when the object 90 is nearer. Accordingly, when there is a high probability that the person will touch the object 90, the display timing of the collision prevention object 250 is set in the above-described way to display the collision prevention object 250 earlier, and therefore the collision can be more likely to be prevented.

The third example of the display control by the display control unit 150 has been described above. A more desirable stereoscopic display of the display object 230 can be realized by the display control no matter what position of the viewpoint 80 the object 90 is viewed from.

2.3. Hardware Configuration of Display Control Apparatus

Figure 24:
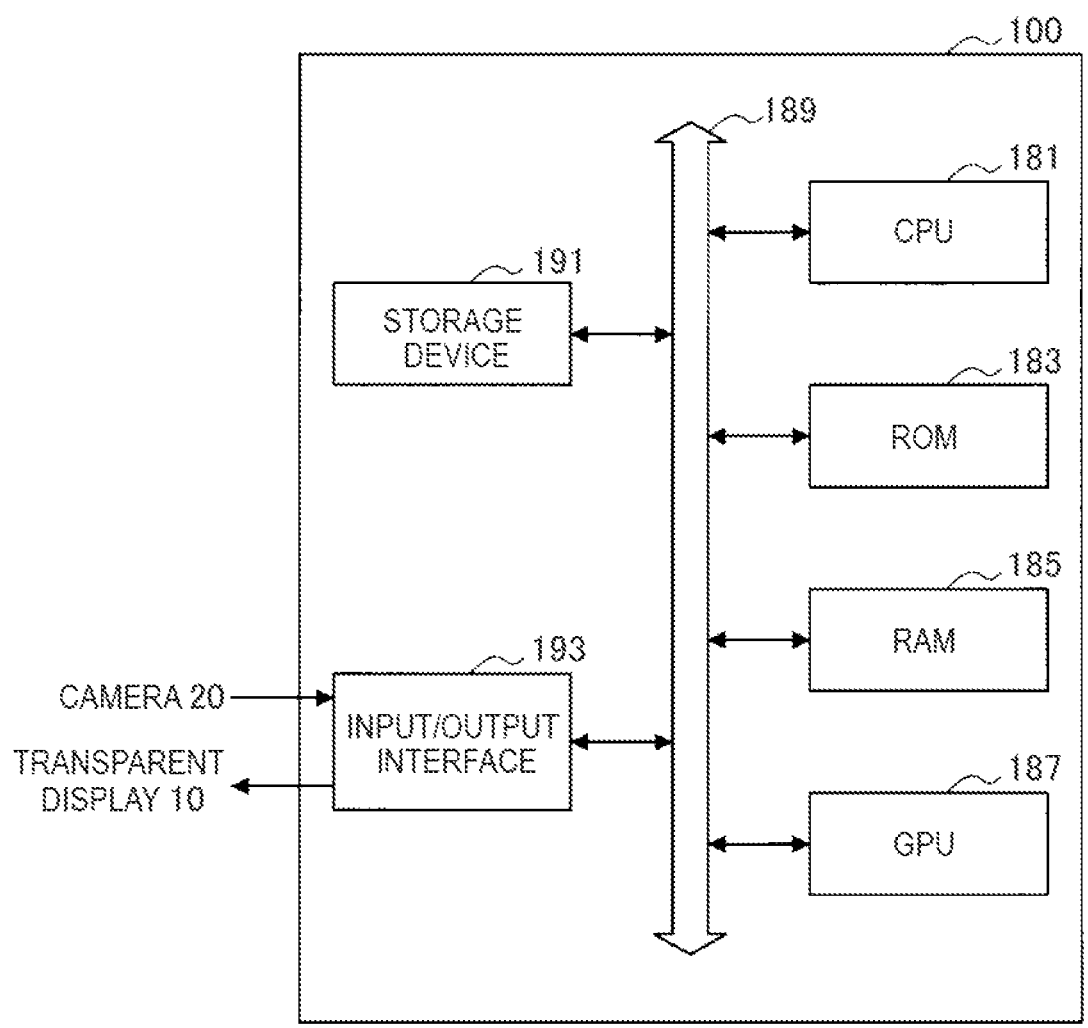
FIG. 24 is a block diagram illustrating an example of a hardware configuration of the display control apparatus according to an embodiment.

Next, an example of a hardware configuration of the display control apparatus 100 according to this embodiment will be described with reference to FIG. 24. FIG. 24 is a block diagram illustrating an example of the hardware configuration of the display control apparatus 100 according to the embodiment. Referring to FIG. 24, the display control apparatus 100 includes a central processing unit (CPU) 181, a read-only memory (ROM) 183, a random access memory (RAM) 185, a graphics processing unit (GPU) 187, a bus 189, a storage device 191, and an input/output interface 193.

The CPU 181 functions as an arithmetic processing device and a control device and controls all or some of the processes of the display control apparatus 100 in accordance with various programs stored in the ROM 183, the RAM 185, or the storage device 191. The ROM 183 stores programs, calculation parameters, or the like used by the CPU 181. The RAM 185 preliminarily stores the programs used by the CPU 181 or parameters or the like changed appropriately in execution of the programs. The GPU 187 performs various processes associated with the display of a display apparatus (for example, the transparent display 10) first from generation of a display screen. The bus 189 connects the CPU 181, the ROM 183, the RAM 185, and the GPU 187 to each other. Further, the storage device 191 and the input/output interface 193 are connected to the bus 189.

For example, the storage device 191 stores various kinds of data such as basic software such as an operation system (OS) or applications. Here, examples of the storage device 191 include a magnetic recording medium such as a hard disk and a non-volatile memory such as an electrically erasable and programmable read-only memory (EEPROM), a flash memory, a magnetoresistive random access memory (MRAM), a ferroelectric random access memory (FeRAM), or a phase-change random access memory (PRAM), but the embodiment of the present disclosure is not limited to the mentioned examples.

For example, the input/output interface 193 connects the transparent display 10, the camera 20, and the like to each other. Here, examples of the input/output interface 193 include a universal serial bus (USB) terminal, a digital visual interface (DVI) terminal, and a high-definition multimedia interface (HDMI) terminal, but the embodiment of the present disclosure is not limited to the mentioned examples.

3. Processing Flow

Hereinafter, first to third examples of a display control process according to this embodiment will be described with reference to FIGS. 25 to 27.

First Example of Display Control Process

Figure 25:
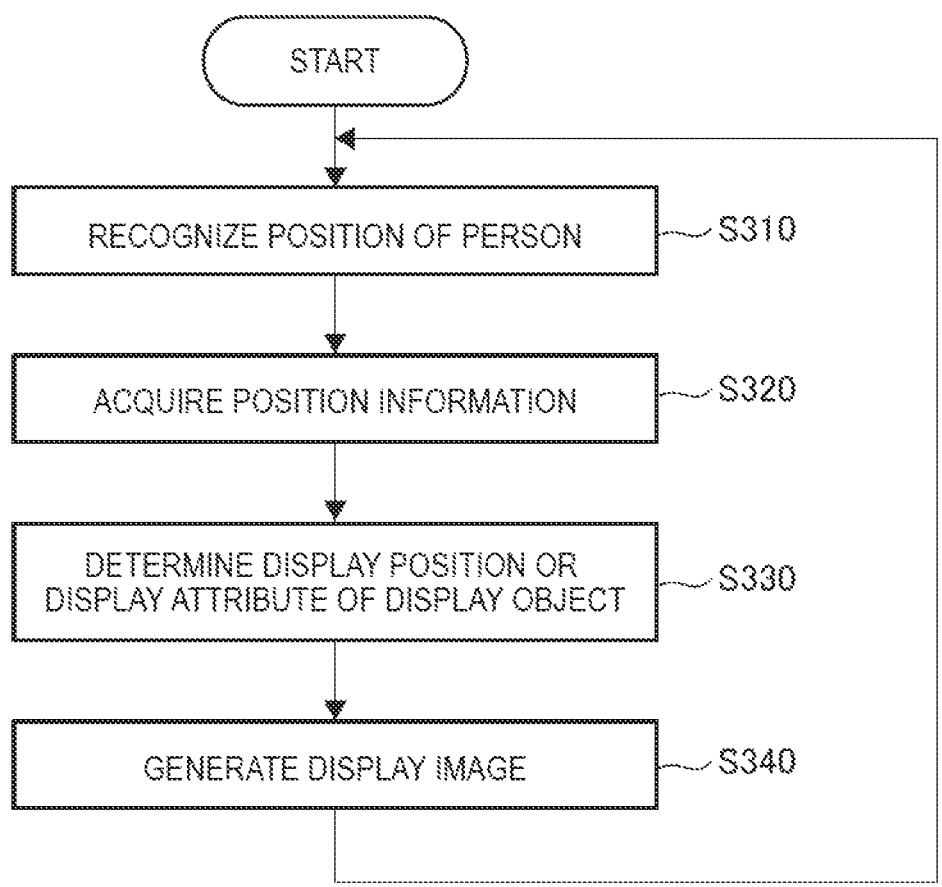
FIG. 25 is a flowchart illustrating a first example of a schematic processing flow of a display control process according to an embodiment.

FIG. 25 is a flowchart illustrating a first example of a schematic processing flow of the display control process according to this embodiment. In the first example of the display control process, the display of the transparent display 10 is controlled by determining the display position or the display attribute of the display object 230 displayed on the screen 200 of the transparent display 10 based on the position information indicating the relative positional relations between the transparent display 10 and the viewpoint 80 and between the transparent display 10 and the object 90.

Referring to FIG. 25, in step S310, the recognition unit 110 first recognizes the relative position of the viewpoint 80 with respect to the transparent display 10 or the object 90.

Next, in step S320, the acquisition unit 120 acquires the position information indicating the relative positional relations between the transparent display 10 and the viewpoint 80 and between the transparent display 10 and the object 90.

Next, in step S330, based on the position information, the display control unit 150 determines the display position or the display attribute of the display object 230 to be displayed on the screen 200 of the transparent display 10.

In step S340, based on the determined display position or the determined display attribute, the image generation unit 140 generates the display image including the display object 230 to be displayed on the screen 200 of the transparent display 10.

Second Example of Display Control Process

Figure 26:
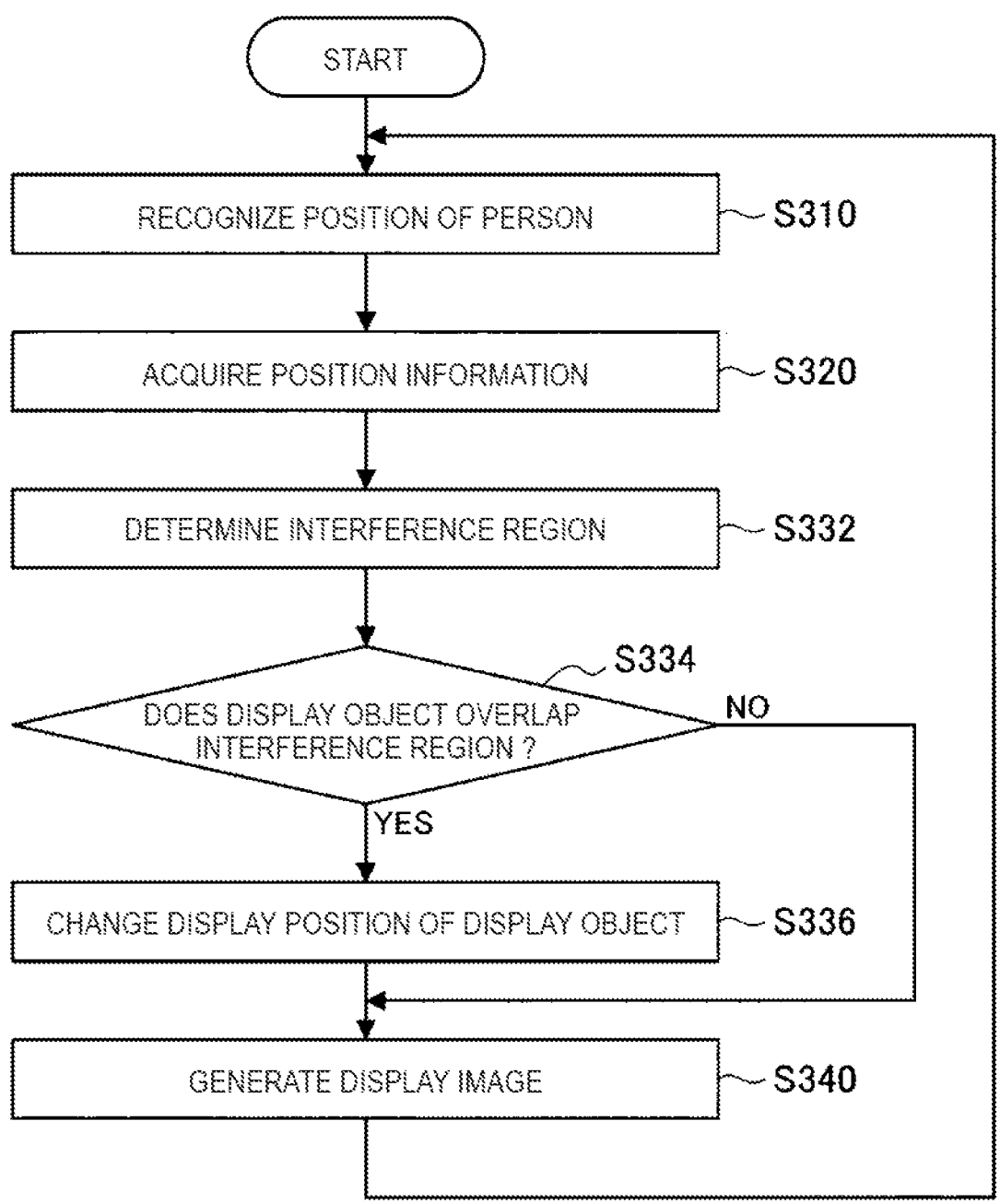
FIG. 26 is a flowchart illustrating a second example of the schematic processing flow of the display control process according to an embodiment.

FIG. 26 is a flowchart illustrating a second example of the schematic processing flow of the display control process according to this embodiment. In the second example of the display control process, the display position of the display object 230 is determined so that the object 90 can be viewed from the viewpoint 80 through the screen 200 of the transparent display 10 in step S330 of the first example of the display control process. Here, only step S332, step S334, and step S336 of the second example of the display control process, which are different from those of the first example of the display control process shown in FIG. 25, will be described.

In step S332, the display control unit 150 determines the interference region 220 based on the position information indicating the relative positional relations between the transparent display 10 and the viewpoint 80 and between the transparent display 10 and the object 90.

Next, in step S334, the display control unit 150 determines whether a display object overlapping the interference region 220 is present in the display object 230 included in the display image. When the display object 230 overlapping the interference region 220 is present, the process proceeds to step S336. Conversely, when the display object 230 overlapping the interference region 220 is not present, the process proceeds to step S340.

In step S336, the display control unit 150 changes the display position of the display object 230 overlapping the interference region 220 so that the display object 230 does not overlap the interference region 220.

Third Example of Display Control Process

Figure 27:
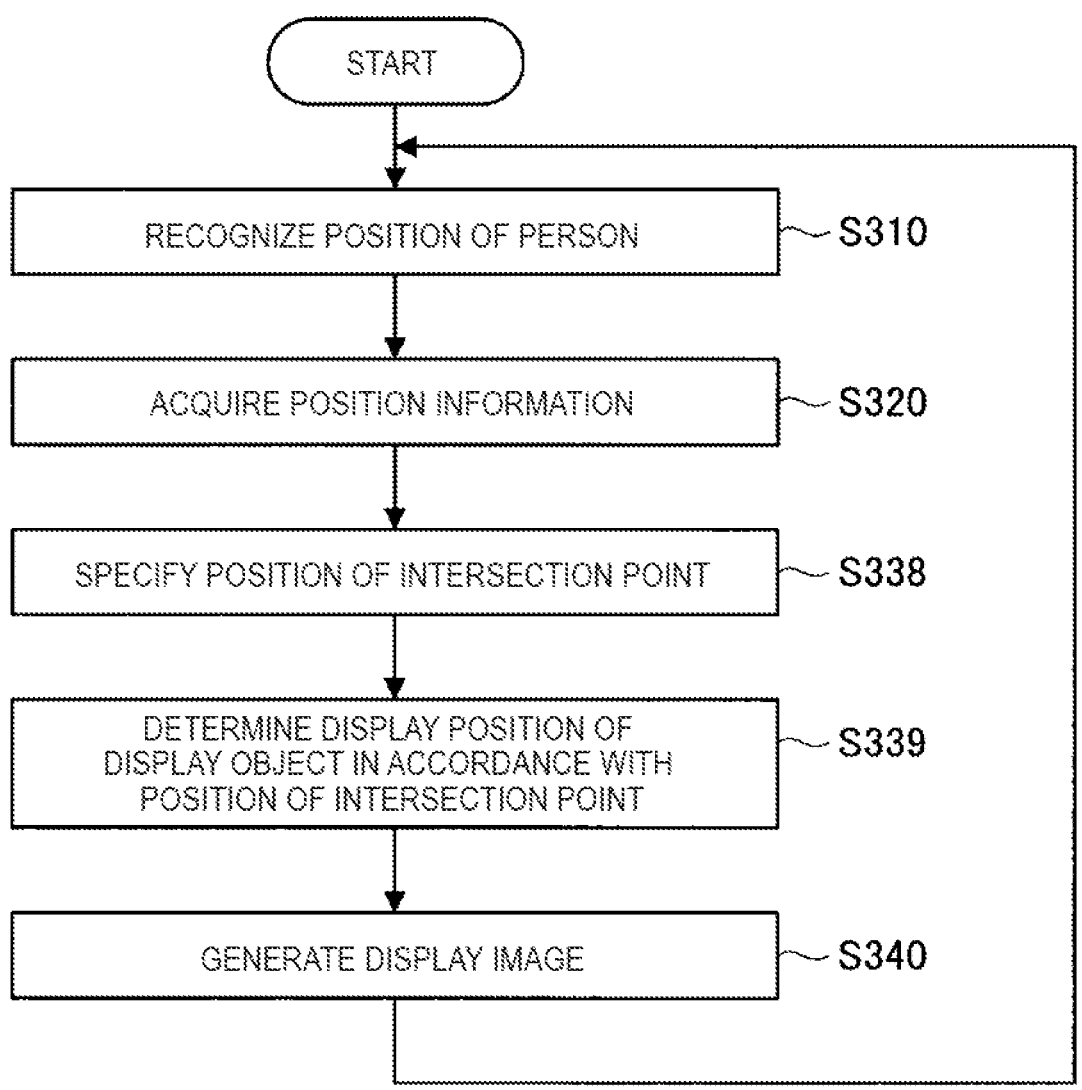
FIG. 27 is a flowchart illustrating a third example of the schematic processing flow of the display control process according to an embodiment.

FIG. 27 is a flowchart illustrating a third example of the schematic processing flow of the display control process according to this embodiment. In the third example of the schematic processing flow of the display control process, the display position of the display object 230 is changed in accordance with the change in the position of the viewpoint 80 or the object 90 in step S330 of the first example of the display control process. Here, only step S338 and step S339 of the third example of the display control process, which are different from those of the first example of the display control process shown in FIG. 25, will be described.

In step S338, the display control unit 150 specifies the intersection point between the screen 200 of the transparent display 10 and the straight line passing through the position of the viewpoint 80 and the position of the object 90 in the position information.

Next, in step S339, the display control unit 150 determines the position of the display object 230 in accordance with the position of the intersection point.

4. Summarization

The display control system 1 and the display control apparatus 100 according the embodiment of the present disclosure have been described above with reference to FIGS. 1 to 27. According to this embodiment, the display of the transparent display 10 can be realized so as to be suitable for viewing the object 90 from the viewpoint 80 through the transparent display 10.

For example, in the first display control, the display of the transparent display 10 is controlled so that the object 90 can be viewed from the viewpoint 80 through the screen 200 of the transparent display 10. Thus, even when the display object 230 is displayed on the screen 200 of the transparent display 10, the object 90 remains easily viewable from the viewpoint 80.

In the second display control, the display of the transparent display 10 is controlled by determining the display position or the display attribute of the display object 230 to be displayed on the screen 200 of the transparent display 10 based on the position information. Thus, no matter what position of the viewpoint 80 the object 90 is viewed from, the more desirable display of the display object 230 can be realized.

In the third display control, the display of the transparent display 10 is controlled by determining the display position or the display attribute of the display object 230 for the stereoscopic view based on the position information. Thus, no matter what position of the viewpoint 80 the object 90 is viewed from, the more desirable display of the display object 230 can be realized.

It should be understood by those skilled in the art that various modifications, combinations, sub-combinations and alterations may occur depending on design requirements and other factors insofar as they are within the scope of the appended claims or the equivalents thereof.

In the above-described embodiment, for example, the display control apparatus including the recognition unit and the image generation unit has been described, but the present disclosure is not limited thereto. For example, the display control apparatus may not include the recognition unit and the image generation unit and another apparatus directly or indirectly connected to the display control apparatus may include the recognition unit and the image generation unit.

Additionally, the present technology may also be configured as below.

(1) A display control apparatus controlling display of a transparent display which includes a screen configured to transmit light arriving from an object located on a side of a second surface so that the object is viewable from a viewpoint located on a side of a first surface which is an opposite surface to the second surface, the apparatus comprising:

an acquisition unit that acquires position information indicating relative positional relations between the transparent display and the viewpoint and between the transparent display and the object; and a display control unit that controls the display of the transparent display based on the position information.

(2) The display control apparatus according to (1), wherein the display control unit controls the display of the transparent display based on the position information by determining a display position or a display attribute of a display object displayed on the screen of the transparent display.

(3) The display control apparatus according to (1) or (2), wherein the display control unit controls the display of the transparent display so that the object is viewable from the viewpoint through the screen of the transparent display.

(4) The display control apparatus according to (3), wherein the display control unit determines a region on the screen of the transparent display based on the position information and controls the display of the transparent display so that the object is viewable from the viewpoint through the region.

(5) The display control apparatus according to (4), wherein the determined region includes an intersection point between the screen of the transparent display and a straight line passing through a position of the viewpoint and a position of the object in the position information or is present around the intersection point.

(6) The display control apparatus according to (4) or (5), wherein the display control unit controls the display of the transparent display by causing a display object to be not displayed in the determined region.

(7) The display control apparatus according to (4) or (5), wherein the display control unit controls the display of the transparent display by setting a display attribute of a display object in the determined region as a display attribute in which the object is viewable from the viewpoint.

(8) The display control apparatus according to (6) or (7), wherein the display object is a display object of which a display position is changed through an operation of a user.

(9) The display control apparatus according to any one of (3) to (8), wherein the viewpoint includes two or more viewpoints, and the display control unit controls the display of the transparent display so that the object is viewable from at least one of the two or more viewpoints.

(10) The display control apparatus according to (2), wherein the display control unit changes the display position or the display attribute of the display object in accordance with a change in a relative position of the viewpoint with respect to the transparent display or a relative position of the object with respect to the transparent display in the position information.

(11) The display control apparatus according to (10), wherein the display control unit changes the display position of the display object in accordance with a change in a position of an intersection point between the screen of the transparent display and a straight line passing through a position of the viewpoint and a position of the object in the position information.

(12) The display control apparatus according to (2), wherein the transparent display displays the display object so as to be stereoscopically viewable, and the display control unit determines the display position or the display attribute of the display object for a stereoscopic view based on the position information.

(13) The display control apparatus according to (12), wherein the display control unit determines the display position of the display object for the stereoscopic view so that the display object is stereoscopically viewed with a depth in a direction from the side of the first surface of the transparent display to the side of the second surface of the transparent display.

(14) The display control apparatus according to (12) or (13), wherein the display control unit changes the display position or the display attribute of the display object for the stereoscopic view in accordance with a change in a position of the viewpoint or a position of the object in the position information.

(15) The display control apparatus according to any one of (12) to (14), wherein the display control unit causes a display object to be displayed to make a person located on the side of the first surface of the transparent display aware of a presence of the transparent display.

(16) The display control apparatus according to (15), wherein the acquisition unit additionally acquires a first distance between the transparent display and the person or a part of a body of the person, and the display control unit causes the display object to be displayed to make the person aware of the presence of the transparent display in accordance with the first distance.

(17) The display control apparatus according to (16), wherein the display control unit causes the display object to be displayed to make the person aware of the presence of the transparent display, even when the shorter a second distance between a position of the transparent display and a position of the object in the position information is, the longer the first distance is.

(18) The display control apparatus according to any one of (1) to (17), wherein the viewpoint is eyes of a person located on the side of the first surface of the transparent display, and the display control apparatus recognizes a relative position of the viewpoint with respect to the transparent display or the object by recognizing a relative position of a face of the person with respect to the transparent display or the object.

(19) A display control method of controlling display of a transparent display which includes a screen configured to transmit light arriving from an object located on a side of a second surface so that the object is viewable from a viewpoint located on a side of a first surface which is an opposite surface to the second surface, the display control method comprising:

acquiring position information indicating relative positional relations between the transparent display and the viewpoint and between the transparent display and the object; and controlling the display of the transparent display based on the position information.

(20) A computer program for causing a computer, which is directly or indirectly connected to a transparent display which includes a screen configured to transmit light arriving from an object located on a side of a second surface so that the object is viewable from a viewpoint located on a side of a first surface which is an opposite surface to the second surface, to execute:

acquiring position information indicating relative positional relations between the transparent display and the viewpoint and between the transparent display and the object; and controlling the display of the transparent display based on the position information.

What is claimed is:

1. A display control apparatus controlling display of a transparent display which includes a screen configured to transmit light arriving from an object located on a side of a second surface so that the object is viewable from a viewpoint located on a side of a first surface which is an opposite surface to the second surface, the apparatus comprising:
  an acquisition unit that acquires position information indicating relative positional relations between the transparent display and the viewpoint and between the transparent display and the object; and
  a display control unit that controls the display of the transparent display based on the position information,
  wherein the display control unit controls the display of the transparent display based on the position information by determining a display attribute of a display object displayed on the screen of the transparent display,
  wherein the display control unit determines a region on the screen of the transparent display based on the position information and controls the display of the transparent display so that the object is viewable from the viewpoint through the region,
  wherein the display control unit controls the display of the transparent display based on a width of the region, wherein the width of the region varies in accordance with a distance between the transparent display and the viewpoint or a distance between the transparent display and the object,
  wherein the display control unit changes the display attribute of the display object in accordance with a change in a relative position of the viewpoint with respect to the transparent display or a relative position of the object with respect to the transparent display in the position information to maintain a state of the display object in relation to the object,
  wherein the transparent display displays the display object so as to be stereoscopically viewable, and
  wherein the display control unit determines the display attribute of the display object for a stereoscopic view based on the position information.

2. The display control apparatus according to claim 1, wherein the display control unit further controls the display of the transparent display based on the position information by determining a display position of the display object displayed on the screen of the transparent display.

3. The display control apparatus according to claim 1, wherein the display control unit controls the display of the transparent display so that the object is viewable from the viewpoint through the screen of the transparent display.

4. The display control apparatus according to claim 1, wherein the determined region includes an intersection point between the screen of the transparent display and a straight line passing through a position of the viewpoint and a position of the object in the position information or is present around the intersection point.

5. The display control apparatus according to claim 1, wherein the display control unit controls the display of the transparent display by causing the display object to be not displayed in the determined region.

6. The display control apparatus according to claim 5, wherein the display object is a display object of which a display position is changed through an operation of a user.

7. The display control apparatus according to claim 1, wherein the viewpoint includes two or more viewpoints, and the display control unit controls the display of the transparent display so that the object is viewable from at least one of the two or more viewpoints.

8. The display control apparatus according to claim 1, wherein the display control unit determines a display position of the display object for the stereoscopic view so that the display object is stereoscopically viewed with a depth in a direction from the side of the first surface of the transparent display to the side of the second surface of the transparent display.

9. The display control apparatus according to claim 1, wherein the display control unit causes the display object to be displayed to make a person located on the side of the first surface of the transparent display aware of a presence of the transparent display.

10. The display control apparatus according to claim 9, wherein
  the acquisition unit additionally acquires a first distance between the transparent display and the person or a part of a body of the person, and
  the display control unit causes the display object to be displayed to make the person aware of the presence of the transparent display in accordance with the first distance.

11. The display control apparatus according to claim 10, wherein the display control unit causes the display object to be displayed to make the person aware of the presence of the transparent display, in an event a second distance between a position of the transparent display and a position of the object in the position information is shorter than the first distance.

12. The display control apparatus according to claim 1, wherein the viewpoint is eyes of a person located on the side of the first surface of the transparent display, and
  the display control apparatus recognizes a relative position of the viewpoint with respect to the transparent display or the object by recognizing a relative position of a face of the person with respect to the transparent display or the object.

13. A display control method of controlling display of a transparent display which includes a screen configured to transmit light arriving from an object located on a side of a second surface so that the object is viewable from a viewpoint located on a side of a first surface which is an opposite surface to the second surface, the display control method comprising:
  acquiring position information indicating relative positional relations between the transparent display and the viewpoint and between the transparent display and the object; and
  controlling the display of the transparent display based on the position information,
  wherein the controlling of the display of the transparent display based on the position information includes determining a display attribute of a display object displayed on the screen of the transparent display,
  wherein the controlling of the display of the transparent display includes determining a region on the screen of the transparent display based on the position information so that the object is viewable from the viewpoint through the region,
  wherein the controlling of the display of the transparent display is based on a width of the region, wherein the width of the region varies in accordance with a distance between the transparent display and the viewpoint or a distance between the transparent display and the object,
  wherein the controlling includes changing the display attribute of the display object in accordance with a change in a relative position of the viewpoint with respect to the transparent display or a relative position of the object with respect to the transparent display in the position information to maintain a state of the display object in relation to the object,
  wherein the transparent display displays the display object so as to be stereoscopically viewable, and wherein the controlling includes determining the display attribute of the display object for a stereoscopic view based on the position information.

14. A non-transitory computer-readable medium having stored thereon a set of computer-executable instructions for causing a computer, which is directly or indirectly connected to a transparent display which includes a screen configured to transmit light arriving from an object located on a side of a second surface so that the object is viewable from a viewpoint located on a side of a first surface which is an opposite surface to the second surface, to execute:

acquiring position information indicating relative positional relations between the transparent display and the viewpoint and between the transparent display and the object; and controlling the display of the transparent display based on the position information, wherein the controlling of the display of the transparent display based on the position information includes determining a display attribute of a display object displayed on the screen of the transparent display, wherein the controlling of the display of the transparent display includes determining a region on the screen of the transparent display based on the position information so that the object is viewable from the viewpoint through the region, wherein the controlling of the display of the transparent display is based on a width of the region, wherein the width of the region varies in accordance with a distance between the transparent display and the viewpoint or a distance between the transparent display and the object, wherein the controlling includes changing the display attribute of the display object in accordance with a change in a relative position of the viewpoint with respect to the transparent display or a relative position of the object with respect to the transparent display in the position information to maintain a desired state of the display object in relation to the object, wherein the transparent display displays the display object so as to be stereoscopically viewable, and wherein the controlling includes determining the display attribute of the display object for a stereoscopic view based on the position information.

15. The display control apparatus according to claim 1, wherein the state is the display object being displayed indicating the object.

* * * * *